United States Patent [19]

Vassiliou

[11] Patent Number: 5,151,293
[45] Date of Patent: Sep. 29, 1992

[54] SIMULATED RAW EGG AND METHODS OF MAKING AND PACKAGING

[76] Inventor: Eustathios Vassiliou, 12 S. Townview La., Newark, Del. 19711

[21] Appl. No.: 750,116

[22] Filed: Aug. 26, 1991

Related U.S. Application Data

[63] Continuation-in-part of Ser. No. 551,160, Jul. 11, 1990, Pat. No. 5,073,399.

[51] Int. Cl.⁵ .............................. A23L 1/32; A23L 1/04
[52] U.S. Cl. ......................................... 426/614; 426/89; 426/104; 426/573; 426/575; 426/576; 426/578
[58] Field of Search .................. 426/89, 104, 573, 575, 426/576, 578, 614

[56] References Cited

U.S. PATENT DOCUMENTS

| | | | |
|---|---|---|---|
| 3,456,867 | 7/1969 | Repko | 229/66 |
| 3,510,315 | 5/1970 | Hawley | 99/133 |
| 3,640,732 | 2/1972 | Johnson | 99/114 |
| 3,652,006 | 1/1970 | Trewella | 229/55 |
| 3,843,825 | 10/1972 | Hawley | 426/393 |
| 3,911,144 | 10/1975 | Strong et al. | 426/588 |
| 3,941,892 | 3/1976 | Glasser et al. | 426/104 |
| 3,987,212 | 10/1976 | Seeley et al. | 426/614 |
| 4,046,922 | 9/1977 | Burkwall, Jr. | 426/104 |
| 4,103,038 | 7/1978 | Roberts | 426/601 |
| 4,103,040 | 7/1978 | Fioriti et al. | 426/614 |
| 4,296,134 | 10/1981 | Boldt | 426/250 |
| 4,409,249 | 10/1983 | Forkner | 426/100 |
| 4,469,708 | 9/1984 | Rapp et al. | 426/103 |
| 5,073,399 | 12/1991 | Vassiliou | 426/614 |

Primary Examiner—Jeanette Hunter
Assistant Examiner—Helen Pratt
Attorney, Agent, or Firm—E. Vassiliou

[57] ABSTRACT

A simulated egg, preferably cholesterol-free, capable of having the yolk and liquid egg-white together but in separate phases, so that upon cooking, the simulated egg looks and behaves like a natural egg. Migration of ingredients from the egg-yolk to the egg-white and vice versa is minimized. The egg is preferably packaged in individual portions in flexible inexpensive pouches.

11 Claims, 2 Drawing Sheets

SIMULATED RAW EGG AND METHODS OF MAKING AND PACKAGING

This is a continuation-in-part of application Ser. No. 07/551,160 filed on 07/11/90 U.S. Pat. No. 5,073,399 which is incorporated herein by reference.

FIELD OF THE INVENTION

This invention relates to simulated eggs, and preferably to cholesterol free simulated eggs capable of having the yolk and liquid egg-white together but in separate phases, so that upon cooking, the simulated eggs look and behave like natural eggs. It also pertains to methods of making, as well as packaging such products.

BACKGROUND OF THE INVENTION

Although the egg represents an outstanding nutritional food, and a food that people enjoy eating, especially as part of the breakfast in the morning, the fact that it is one of the richest foods in cholesterol has forced an enormous number of people to avoid consuming eggs.

A large number of attempts have been made to answer this problem, but the solutions presented so far have been either totally or partially unacceptable.

This is because, up to the point of this invention, no practical and/or economically feasible solution has been found to incorporate a simulated and preferably a cholesterol-free egg yolk into egg-white and preserve them in separate phases, so that one can make for example a "sunny side up" or an "over easy" egg. Thus, the only economical but still highly compromised solution, which has been found commercially feasible thus far, has been the one according to which the egg yolk is removed and substituted usually by an equivalent amount of egg white, a yellow-orange food-colorant and small quantities of other adjuncts improving desired properties of the simulated egg. Since this type of a simulated egg has the consistency and appearance of mixed egg-whites with egg-yolks, it can only be used as "scrambled eggs", or omelette, or more generally in cooking recipes requiring mixed egg-yolks with egg-whites. This is a serious draw-back because it does not provide people with the option to have a cholesterol-free fried or poached egg having an egg-yolk in a separate phase from the white. An egg with the yolk in a separate phase from the white is highly desirable to a large number of people.

Such products are the subject of a number of U.S. Patents. Representative ones, among others, are U.S. Pat. Nos. 3,911,144, 3,987,212, 4,103,038, and 4,296,134.

A method of preparing an egg-yolk substitute and resulting products from its use is described in U.S. Pat. No. 3,864,500. The invention of this patent is directed mainly to the addition of the resulting egg-yolk in recipes of products such as cakes, cookies, and the like, so that shaping and preserving the yolk in liquid egg-white is not important. Thus, no mention or suggestion on how to shape and preserve a shaped egg-yolk in liquid egg white is made.

A number of attempts have also been made in creating products, wherein the egg-yolk is combined with the egg-white in different phases, with limited success. These references do not disclose, suggest, or imply any methods of providing an egg having a monolithic egg-yolk in a separate immiscible phase within liquid egg-white before cooking, which egg-yolk is adequately non-flowable to retain its monolithic structure, but which yolk becomes controllably flowable after conventional cooking, in contrast with the present invention which provides such products and methods for making the same.

U.S. Pat. No. 3,510,315 (Hawley) describes a solid simulated prepared egg product, wherein a solid cooked egg-yolk is surrounded with a solid cooked egg-white.

U.S. Pat. No. 3,640,732 describes a simulated cooked egg approximating a boiled, poached or fried hen's egg.

U.S. Pat. No. 3,843,825 (Hawley) provides a product resembling a hard boiled egg cut in half, by appropriately molding and coagulating egg-white.

U.S. Pat. No. 4,046,922 (Burkwall) discloses a shelf-stable cooked, simulated egg comprising specified amounts of egg-solids, edible water absorbing hydrocolloid, a high protein binding agent, water, and either sugar, sugar equivalents, or mixtures thereof.

U.S. Pat. No. 3,941,892 (Glasser et al.) discloses an egg product made by molding a low cholesterol egg-yolk portion of critical formulation together with an egg-white portion, and subjecting the egg to freezing. In the preferred embodiment, the mold employed in forming the egg product is employed as the package.

U.S. Pat. No. 4,103,040 (Fioriti) discloses a wet egg-yolk which is combined with edible oil by high energy, high shear mixing, so that the cholesterol is extracted by the oil from the egg-yolk. At the same time the ratio of the polyunsaturated fats to the saturated fats increases. The yolk, after separation from the oil can become a constituent of various egg-products.

U.S. Pat. No. 4,409,249 (Forkner) describes a method according to which high energy agitation is applied to coagulated and uncoagulated egg-white portion to form a homogeneous, aerated egg white dispersion. The egg-white dispersion is then assembled with processed egg-yolk and the assembly is frozen.

The instant invention, in contrast with the previous approaches, provides novel ways of resolving this vexing problem. It also provides solutions to problems arising from ingredients migrating from the egg-white to the yolk and vice-versa.

In addition to the properties of the product itself, its packaging is also of utmost importance, because it has to be convenient for the consumer, efficient, and at the same time inexpensive, especially in cases in which it is highly desirable to have individual portions of eggs. The products existing in the market so far are offered in multiple portions per carton. This is not very objectionable in the case of eggs simulating mixed egg-yolks with egg-whites, but it would be more objectionable in the case of a product of the category disclosed in the present invention, where the egg-yolk is in a separate phase than the white. In such a case, it would be desirable to have individual portions of eggs containing one egg-yolk and the corresponding amount of egg-white per container.

Although one would not think that a flexible package, such as for example one made of inexpensive polymers, like for example polyvinyl chloride, polyvinylidene chloride, or polyethylene, could be suitable for this type of application, because the yolk could be easily destroyed during handling of the flexible package, it was found by Applicant that in contrast, a flexible package substantially filled with egg-white, forms a bulge within which the yolk is more than adequately protected. The present invention also provides means enabling the consumer to open such packages in a very easy and convenient manner.

U.S. Pat. No. 3,456,867 (Repko) discloses a bag assemblage comprising a gusset (inverse fold) across an edge of the bag and a weakened tear line within the gusset. However, the ways proposed for forming the weakened line, such as scoring by pressure or heat or using multi-ply structures, where one ply has been weakened along the tear line, are either non-reproducible or expensive respectively.

U.S. Pat. No. 3,652,006 discloses a flexible package having a pleat formed along one edge to provide a pair of adjacent outwardly extending and readily graspable folds. The folds are reinforced by stiffening strips or by adhesive material, except along the fold line between the folds, so that when the folds are grasped and pulled apart the package will tear open along the fold line between the reinforced folds. One big problem that this approach confronts, is that the whole package has to be made of rather thin packaging material for the fold line to be easily tearable.

In contrast to these approaches, the present invention provides an inexpensive, highly efficient, and highly convenient to the consumer package, having a tearable opening and being suitable for packaging the simulated eggs of this invention, as well as any other products, regardless of whether they are liquid or solid, as explained hereinbelow.

SUMMARY OF THE INVENTION

In the present state of art regarding simulated eggs, either cumbersome, inconvenient, and/or expensive approaches have been proposed to prepare and use eggs having yolks in a separate phase from the egg-white, or the idea has been abandoned, and products having mixed egg-yolks with egg-whites have been the only ones to be practically and economically feasible, so as to find their way to the marketplace.

As indicated by the references cited above, the methods having been used so far to keep the egg-yolk in a separate phase from the egg-white have either employed an "overkill" approach, such as permanently solidifying both the egg-yolk and the egg-white, or inadequate approaches, such as molding and freezing the egg-yolk and then freezing the total egg, after the white has been added. The eggs of the former category lack flexibility and appeal. They give the impression, as far as the consumer is concerned, of "leftovers" or eggs which have to be reheated. The eggs of the second category require extreme accuracy and dexterity in preparation for consumption, especially during thawing and cooking. For example, if they are allowed to thaw completely, the egg-yolk will start being mixed spontaneously with the egg-white, since they will both be in the liquid state. Even if they do not mix excessively, the yolks will spread or even be divided into more than one globules during transferring them from the package to the cooking pot or pan. Even in the case of Forkner's Patent (U.S. Pat. No. 4,409,249), in which case the egg-yolk is more securely contained by an optional membrane around the yolk and the egg-white which is gelling during thawing, the spontaneously produced gel structure of the egg-white does not allow the egg to be poured from the package to the pan and fried, for example, as a regular egg.

It has now been discovered by the applicant that a simulated egg may be made to give an excellent impression and resemblance to a real egg in both image and behavior if a number of requirements set forth by the applicant are met.

The instant invention is thus directed to a simulated egg, as well as methods for making and/or packaging the same. According to this invention, a simulated egg is provided, wherein the egg-yolk and the liquid egg-white may coexist in the same container in separate phases without one dissolving in the other. When cooked, preferably fried or poached, the egg of this invention may be made to controllably look and taste like a real egg in any number of forms, such as "sunny side up", "over easy", "over medium", "over hard", and the like. It may also take the form of a novelty item as far as the shape and color of the yolk are concerned. The egg of the present invention may be frozen and then thawed, and stay thawed for long periods of time without the egg-yolk been mixed into the liquid egg-white. Of course, it may then be cooked and consumed, as long as spoilage has not occurred. The present invention also provides solutions to problems arising from ingredients migrating from the egg-white to the yolk and vice-versa.

More particularly, the present invention pertains to a simulated raw egg comprising:
egg-white, the egg-white being liquid at room temperature; and
a homogeneous shaped monolithic separate phase of a simulated non-flowable, egg-yolk disposed in the egg-white, said egg-yolk comprising an edible liquid, a colorant, and a positive thermoreversible gel former, the gel former being in a minimum effective amount to render the egg-yolk
non-flowable, as to substantially retain its monolithic status in, and be substantially immiscible with the liquid egg-white at room temperature after the egg-yolk has been chilled, and
flowable at serving temperatures between cooking temperatures and room temperature for at least a finite period of time, after the egg-yolk has been brought to said serving temperatures from a higher temperature at which the egg-yolk becomes flowable.

The present invention also pertains to a simulated raw egg comprising:
egg-white, the egg-white being liquid at room temperature and containing an additive solute; and
a homogeneous shaped monolithic separate phase of a simulated non-flowable, egg-yolk disposed in the egg-white, said egg-yolk comprising an edible liquid, a colorant, and a positive thermoreversible gel former, the gel former being in an effective amount to render the egg-yolk
non-flowable, as to substantially retain its monolithic status in, and be substantially immiscible with the liquid egg-white at room temperature after the egg-yolk has been chilled, and
flowable at serving temperatures between cooking temperatures and room temperature for at least a finite period of time, after the egg-yolk has been brought to said serving temperatures from a higher temperature at which the egg-yolk becomes flowable;
the egg-yolk being characterized by an initial weight gain rate when it is in the egg-white in the absence of the additive solute; and
the additive solute being in an effective amount to decrease the initial weight gain rate by at least 10%.

The present invention further pertains to a method of making a simulated raw egg, the method comprising the steps of:

preparing a homogeneous simulated, non-flowable, egg-yolk by mixing an edible liquid, a colorant, and a viscosity modifier, the modifier being in an effective amount to render the egg-yolk non-flowable, as to substantially retain its monolithic status in, and be substantially immiscible with the liquid egg-white at room temperature after the egg-yolk has been chilled, and flowable at serving temperatures between cooking temperatures and room temperature for at least a finite period of time, after the egg-yolk has been brought to said serving temperatures from a higher temperature at which the egg-yolk becomes flowable;

shaping the mixture into monolithic egg-yolk portions;

lowering the temperature to a level adequate to render the egg-yolk portions non-flowable, as to substantially retain their monolithic status and be substantially immiscible in liquid egg-white at room temperature;

immersing the egg-yolk portions in an aqueous medium, the aqueous medium being adaptable to increase the weight of each egg-yolk portion to a predetermined degree;

removing the egg-yolk portions from the aqueous medium when the predetermined degree of weight increase has been achieved; and adding the monolithic egg-yolk portions to liquid egg-white.

In this method, the aqueous medium is preferably water.

In other preferred embodiments of the above described simulated eggs, one of the following or preceding conditions, or any combination thereof applies:

the simulated raw egg further comprises a restrictive barrier surrounding the egg-yolk;

the restrictive barrier preferably includes a hydrocolloid having gel-limiting dissolution in the egg-white at storing temperatures, and film forming behavior at cooking temperatures;

the egg-yolk comprises also a viscosity builder;

the egg-yolk has a disk shape; and the egg is packaged in a flexible pouch, preferably of the type described hereinbelow.

Finally the present invention pertains to a flexible pouch comprising in combination an assembly of a first side wall, a second side wall, and an edge wall;

the flexible pouch having a cavity confined by the first side wall, the second side wall, and the edge wall for packaging an item;

the first and second side walls having common ends, and a first thickness;

the edge wall having a length, a width, and a second thickness;

the edge wall being sealed on each of the first and second side walls, so as to form two adjacent substantially parallel seals at an additional non-common end, the parallel seals being separated by the edge wall;

the first side wall and the second side wall extending beyond each respective parallel seal, so as to form a first flap and a second flap correspondingly; and the second thickness being adequately smaller than the first thickness so that when a manual pulling-apart force is applied on the flaps, the edge wall breaks along its length between the parallel seals without the break being propagated beyond the parallel seals.

In other preferred embodiments of the above described flexible pouches by themselves or in combination with the aforementioned simulated eggs, one of the following or preceding conditions, or any combination thereof applies:

the item to be packaged comprises a flowable material, which preferably is an egg product;

the first flap of the flexible pouch has a first flap width and the second flap has a second flap width, the first flap width being larger than the second flap width, so that the flaps may be grasped and separated more easily;

the first side wall, the second side wall, and the edge wall comprise a thermally sealable material, which preferably comprises polyethylene;

the portions of the walls confining the cavity have been treated with a release material, which preferably comprises polytetrafluoroethylene;

the edge wall comprises a polymer having linear tear properties along the length of the edge wall;

the width of the edge wall is between 0.1 and 1 millimeter;

the flexible pouch further comprising a left seal and a right seal; and the second flap has been partially separated from the first flap through cuts along the left and right seals.

BRIEF DESCRIPTION OF THE DRAWING

The reader's understanding of the this invention will be enhanced by reference to the following detailed description taken in combination with the drawing figures, wherein.

DETAILED DESCRIPTION OF THE INVENTION

Figure 1A:
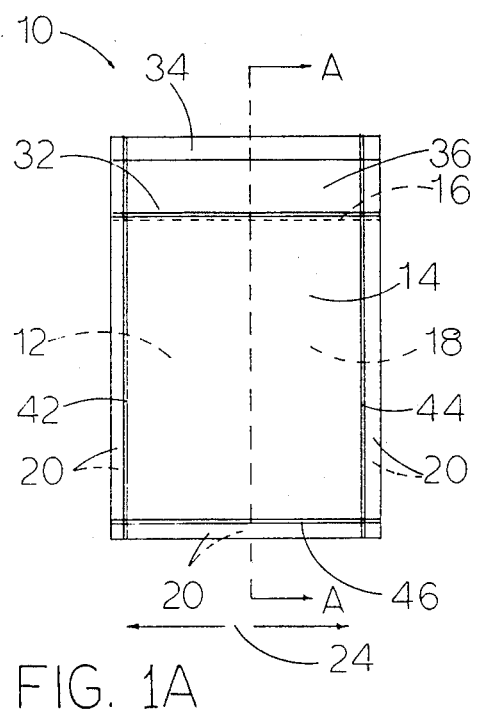
FIG. 1a illustrates the front view of a flexible pouch, which may be used for packaging the eggs of this invention according to a preferred embodiment.

It has been discovered by the applicant that a simulated egg may be made to give an excellent resemblance to a real egg in both image and behavior including texture and mouthfeel, if a number of requirements set forth by the applicant are met.

The instant invention is thus directed to a simulated egg, as well as methods for making and packaging the same.

When cooked, preferably fried or poached, the egg of this invention looks and behaves like a real egg. The egg-yolk is composed in a way to be controllably flowable at serving temperatures, while it remains non-flowable within the egg-white at storage and handling temperatures before cooking, to retain its monolithic status.

Room temperature is a temperature of about 20° to 25° C., while cooking temperatures are the temperatures over the temperature at which the egg-white coagulates. The egg-white may start coagulating in the vicinity of about 60° C. (139°-140° F.), depending on its exact composition. Serving temperatures range between cooking and room temperatures.

The egg-yolk in preferred embodiments of this invention has preferably the shape of a disk and a yellow (real egg-yolk like) color. However, it may also take the form of a novelty item as far as the shape, color, or taste of the yolk are concerned, as it will be explained in more detail later. The egg of the present invention may be frozen and then thawed, and stay thawed for long periods of time without the egg-yolk been mixed into the egg-white. Of course, it may then be cooked and consumed, as long as spoilage has not occurred.

Any type of egg-white, whether natural or simulated may be used for the purposes of this invention. However, a modified egg-white, in which Xanthan gum has been added to impart freeze thaw stability is preferred. The stabilized egg-white may be made in a similar way as the egg product described in U.S. Pat. No. 3,911,144 is made. The egg-yolk is simulated as defined below, thus rendering the whole egg itself simulated. In the context of this invention, a simulated egg-yolk is an egg-yolk which is not fully natural. Even though the preferable egg-yolks of this invention contain low or no cholesterol, the cholesterol content does not present limits to this invention.

In the preferred embodiments of this invention, the amount of calories provided by the yolk is minimal.

An important feature of this invention is that it provides a simulated egg, wherein the egg-yolk and liquid egg-white may coexist in the same container in separate phases without one substantially affecting or dissolving in the other. Still small amounts of ingredients may migrate from the egg-yolk to the egg-white, or vice versa, as long as this migration does not have undesirable or catastrophic results. Such migration may usually increase with time and temperature, and therefore, the time and temperature elements have to be considered on the basis of the final application. If for example, in a particular product the egg-yolk of the present invention is to remain in contact with liquid egg-white for a maximum of one weak at room temperature, then the egg-yolk should be substantially immiscible with egg-white under these conditions. On the other hand, if in a second product, the egg-yolk is packaged separately, and it is added to the white just before cooking, the requirement of immiscibility will accordingly be considerably less demanding.

Another important feature of this invention is that it provides an egg-yolk which may stay within liquid egg-white in a monolithic form without substantially loosing its monolithic structure, and which becomes controllably flowable upon cooking. By using the word "monolithic", it is meant that the egg-yolk is shaped in a separate phase without substantially mixing with the white, unless of course it is forced to do so by excessively forceful mixing, at least at temperatures not exceeding room temperature. Although "monolithic" usually refers to a single entity, in this discussion it is used mainly to stress individuality, and the fact that the egg-yolk does not mix with the egg-white. Thus, if desired, one may use more than one egg-yolks within a single package of egg-white, since configurations having a multiplicity of egg-yolks in the egg-white are still considered to have monolithic egg-yolks; the word "monolithic" refers to each individual egg-yolk, and not to the whole egg package. In addition to been monolithic, it is highly preferable for the egg-yolk of this invention to also be homogeneous. By the word "homogeneous" is meant that the egg-yolk will not contain large distinguishable pieces in different phases, and that it will look and feel uniform to approximate a real egg-yolk. Of course, this definition does not include a skin around the egg-yolk, which may be present, and which is desirable mainly in helping to prevent spreading of the egg-yolk during cooking.

The shape of the egg-yolk does not have to be rigid, and it may be flexible as long as no substantial mixing between the egg-yolk and the egg-white occurs. Small amounts of ingredients may migrate from the egg-yolk to the egg-white and vice versa, as long as they do not bring about adverse results. A rounded disc shape is preferred, but other shapes may be desirable as discussed later.

As with the requirement of immiscibility, the requirement of monolithicity, as well as any other requirement, should be taken in view of the final intended use, and therefore it should be met during the period of the intended end-use. Nevertheless, regardless of final end-use, it is preferable that the simulated eggs of the present invention perform satisfactorily after being maintained for at least one day at room temperature, more preferably three days in the refrigerator, and even more preferably 7 days in the refrigerator. It is also preferable that the simulated eggs of this invention may withstand freezing temperatures for extended periods of time in order to be preserved in a frozen state accordingly.

It is important to the preferred embodiments of this invention that the yolk may be suspended within and supported by the liquid egg-white, without strong external containment, such as for example, gelled environment like gelled egg-white, a membrane surrounding the yolk, and the like. This may be obtained by composing the yolk in a way to be adequately non-flowable so that it does not subdivide into smaller portions, does not run, and in general does not mix with the liquid egg-white upon normal handling and storing of the egg. An unmodified real egg-yolk, for example, in case it were to loose the skin which contains it, would spread and run within the egg-white and would loose its monolithic status. It is further preferred, that the egg-yolk is sufficiently non-flowable at room temperature so a: to be a solid or a gel. For all practical purposes the meaning of a solid and a gel is substantially the same as far as this invention is concerned. According to this invention, gels are considerably preferable than pastes, which many times at first glance may look in small and light quantities is gels. Pastes are considered as flowable materials or liquids in the present invention. One difference between a gel and a paste is that the paste may be stirred without turning into crumbs or individual small pieces, while if one attempts to stir a gel, the gel will break into smaller individual gel pieces.

When the egg-yolk is in a solid or gelled form within liquid egg-white, it presents numerous advantages. One of the most apparent ones is that it does not loose its desired shape, for example of a disc, during storing and handling before cooking the egg, even under harsh conditions. Another advantage is that it may be handled and treated considerably more easily during its manufacture, such as for example storing the finished yolk before adding it to the white, coating the yolk, and the like. A further advantage is that a solid egg-yolk may even be easily packaged in a separate container and mixed with the white at any desired time, even just before cooking. This separate packaging technique presents the convenience of giving the freedom to the cook to use just one bulk supply of egg-white with individually packaged egg-yolks of different types, such as "sunny side up", "over easy", and the like, as it will be explained later. Still a further advantage is that it does not rely on external containment as aforementioned to hold its monolithic structure. Thus, in case it is surrounded by a membrane or any other type of a barrier, and the membrane raptures, the yolk will still retain its monolithic status, in contrast with a liquid egg-yolk, which would inevitably loose its monolithicity. In addition, it becomes possible to use looser barriers which would not be able to contain a liquid yolk within liquid white before cooking, but which present serious advantages as explained in another section of this discussion according to preferred embodiments of this invention.

Temperatures not exceeding room temperature are the normal temperatures at which an egg is being handled before cooking. This invention takes advantage of the thixotropic behavior of certain materials to provide desirable characteristics to the simulated egg-yolk. Due to thixotropy, a material may be, for example, firm (as a gel or have high viscosity) at room temperature when brought to room temperature from a lower temperature, while the same material may insist in being quite flowable (low viscosity) at room temperature for a period of time, if brought to room temperature from a higher temperature. This period may be short or very extended. In the practice of this invention, different non-flowability or firmness degrees, during storage and before cooking, may be required depending on the application and the specifications of what may be acceptable or desirable in each particular case.

It should be noted that a person of ordinary skill in the art may vary the parameters provided by this invention and receive the desired results without undue experimentation. This is true for the firmness, as well as any other parameters relative to additional desired properties.

It is also important for the egg-yolk of the present invention not only to have adequate non-flowability during storage, but also to be immiscible with the egg-white during handling, and at least resistant in mixing with the egg-white during cooking.

In addition to the above, it is very important that the egg-yolk becomes controllably flowable at a predetermined range of serving temperatures between cooking temperatures and room temperature. This is so in order to have an egg, which looks and behaves as a real one upon cooking. By this, it is meant that the composition of the yolk should be such as to allow the egg to look as a "sunny side up", or "over easy", or "over medium", or "over hard" and the like by controlling the flowability at the desired serving temperature range, at which the egg is to be consumed. Although all levels of flowability are included in the realm of the instant invention, the flowabilities which represent "sunny side up", "over easy" and "over medium" egg yolks are preferable.

What is very important to this invention is that the egg-yolk is initially in a gel form at room temperature, and it passes through a stage at which it becomes liquid as the temperature is raised toward cooking temperatures. Then the egg-yolk may be flowable at serving temperatures, or if the yolk contains an appropriate amount of a coagulant, such as albumin for example, may become even solid, after it has become flowable, if so desired, by extending the cooking time.

As already mentioned, the egg-yolk of the present invention comprises an edible liquid, a viscosity modifier, and a colorant. The edible liquid is preferably aqueous, with the option of having different ingredients dissolved, emulsified, or dispersed therein. Examples of edible liquids are water and milk, among many others. The viscosity modifier, which provides a major part of the functions characterizing the egg-yolks of this invention, may be a single ingredient or a combination of ingredients, each ingredient fulfilling at least partially the needs of a desired property. The viscosity modifier may be natural or artificial, intrinsic to the edible liquid, or external and added to the liquid. It may also be a simple compound, or a mixture of compounds. It is only important that it provides the desirable properties and flow characteristics according to this invention. The colorant, if it has a yellowish cast, is necessary to make the simulated egg-yolk resemble a real one, and in general, when it has any color at all except white, to make the yolk visibly distinguishable from the egg-white. Thus, it may have a yellow color, or any other color for special effects.

Preferably, the modifier comprises a positive gel former. By "positive" it is meant that the gel configuration or status is assumed upon decreasing the temperature. The gel formers may also be categorized into thermally reversible or thermoreversible and to non-reversible gel formers. The thermoreversible ones may go from a more flowable status to a gel status and back to the more flowable status repeatedly, while the non-reversible ones do not change considerably after they have assumed the gel configuration. The preferred positive gel formers according to this invention are thermoreversible for a plurality of reasons, which will become apparent during the course of this discussion. When the term "reversible" is used, it has the meaning of thermoreversible, unless otherwise stated.

An important role of the positive gel former is to provide the egg-yolk with the ability to preserve its desired shape during its manufacture and during the period of time the egg-yolk is stored and handled while being in liquid egg-white. A good example of a preferred positive reversible gel former is gelatin. Gelatin solutions have a gel point in the vicinity of room temperature (20°-25° C.), and they have the advantage of being in the flowable configuration at human body temperatures. Thus, before cooking an egg with a yolk containing an appropriate amount of gelatin as a positive thermoreversible gel former, the egg yolk remains in the gelled configuration at room temperature, and any desired shape of the yolk may be maintained, even after harsh treatment of the egg, in a package for example, containing the yolk within liquid white. Upon cooking of the simulated egg, the gel melts and provides a liquid egg-yolk within the white, which white finally solidifies. It is important to note that the yolk may remain flowable at room temperatures following the cooking cycle for appreciable periods of time, while at the same temperatures it was non-flowable before cooking. This is a very important thixotropic property that the preferred embodiments of the present invention take advantage of.

The viscosity of the molten egg-yolk may be raised to attain any desired viscosity at serving temperatures, higher than that provided by the positive gel former, by the addition in the egg-yolk composition of a viscosity builder, such as for example a starch, or a gum, or a number of other natural or artificial ingredients, preferably in a polymeric configuration. Certain viscosity builders, such as starches for example, when combined with a positive thermoreversible gel former, such as gelatin for example, may provide the additional advantage of increasing the time that the yolk remains flowable at room temperature following cooking.

The amount of the gel former in the composition of the yolk depends mainly on the nature of the gel former and on the desired firmness of the gel. If excessive amounts are used, the viscosity of the molten gel may become excessively high, and the yolk may attain a sticky or gummy mouthfeel, among other undesirable effects. If too small amounts are used, an excessively weak gel may result, which would be difficult to handle and maintain intact.

However, it has been observed by the applicant, that the higher the amount of gel former in the formulation of the yolk, the more easily the yolk absorbs water when being in a liquid environment. From this point of view, it is desirable to use the minimum amount of gel former, which forms a non flowable configuration or a gel, especially if the egg-yolk is to be added into the egg-white during storage. If, however, the egg-yolk is to be stored by itself and be added to the white just before cooking, a stronger gel is needed, and more gel former may be used advantageously.

It is believed, without this to be intended to limit the scope of this invention, that absorption of water by the yolk, when the yolk is in a liquid environment, is due to osmotic pressures arising from the semipermeable structure of the gel (similar to a semipermeable membrane) and the differences in solutes and aqueous and water between the yolk and the liquid. This is supported by the fact that faster weight increase of the yolk is observed when the yolk is in water than when it is in egg-white.

Thus, increase of the weight of the yolk, involves also increase of the volume of the yolk, and it is believed to be due mainly to osmotic absorption of water. This increase in weight, or absorption of water with time is undesirable because it decreases the viscosity of the yolk when it is in the molten state, and thus the degree of control of the viscosity at service temperatures is decreased. Therefore, it becomes important as aforementioned to utilize the minimum amount of gel former which still gives a non-flowable gel structure at room temperature after the egg-yolk has been chilled. An added advantage of such a configuration is that after cooking, and if the yolk is flowable at serving temperatures, it remains flowable for longer periods of time. That is, the thixotropic hysterisis loop of the viscosity/temperature curve at a constant rate of raising and decreasing the temperature becomes larger.

The rate of water absorption or weight increase with time, when the yolk is in a liquid environment, is not constant. It is initially much higher, and then it tends to level off, until no further absorption occurs. Thus, during the initial 24 hours it is rather high, and for the purposes of this invention, the absorption during the first 24 hours is referred to as the initial absorption rate and corresponds to an initial weight gain rate.

It was found that the initial weight rate gain could become insignificant by minimizing the amount of gel former (gelatin in one of the examples presented later) in the yolk formulation. It should be understood that any factor that has a slowing effect on the initial weight gain rate, it affects even more the weight gain rate at later times, and this is why the magnitude of the initial weight gain rate or of the initial water absorption rate is very important, and represents a very good measure of how the yolk behaves with respect to viscosity control at serving temperatures.

Another way to decrease the initial weight gain rate is to use a restrictive barrier around the yolk, as described in detail hereinbelow.

Further, a different way is to use any additional solute in the egg-white in such an amount that will decrease the initial weight gain rate by at least 10%, which is considered to start becoming an appreciable decrease. It is speculated that addition of solutes in the egg-white, or in any liquid in which the yolk resides, decreases the osmotic pressure which would drive water from the white to the yolk. It seems that the weight gain of the yolk, or the osmotic pressure formed between the yolk and the egg-white, is due to the fact that the simulated yolk contains solutes of such types and amounts that they produce an osmotic pressure to drive the water from the egg-white to the egg-yolk. Thus any solute added to the white would have a tendency to reduce such an osmotic pressure. In the absence of appreciable amounts of any solutes in the yolk, a negative weight gain rate (weight loss) occurs. For example, a yolk made substantially of gel former, such as gelatin for example, loses weight when immersed in egg-white.

The solutes that may be utilized in the white for decreasing the initial weight gain rate may be any substances which are soluble in the white. It is preferable that they are of the same type of solutes which are contained in the egg-yolk. In any event, they should not be catastrophic to other desirable properties of the white, the yolk, or the egg as a whole. Viscosity builders, which may raise the viscosity of the white at room temperature to even the point of a paste, are also useful in decreasing the weight gain rate. Egg-whites in a gelled form are not desirable, since gels are non-flowable, and they separate into pieces upon stirring, while pastes are stirrable and do not break into pieces.

An additional way of achieving similar results is to immerse the egg-yolk in an aqueous medium which provides accelerated tendency to the yolk to absorb water. Relatively pure water, such as tap water for example, is a preferred aqueous medium for this purpose. According to this technique, the egg-yolk is formulated with less water than it is supposed to contain in order to provide a desirable viscosity at serving temperatures. The yolk is then immersed in water until it gains the missing water. It has now a much lower tendency, if any, to absorb water, especially from aqueous media containing solutes, such as egg-white for example which contains albumin. Thus, when the yolk treated in the above manner is finally put in egg-white, its tendency to absorb any further water is insignificant.

It is evident that depending on the situation, a single technique of the ones described above, or any combination thereof may by utilized in accordance with the present invention.

Taking into account the teachings of the present invention, a person with ordinary skill in the art may determine without any difficulty the desired levels for a particular gel former in order to receive a particular result. As aforementioned, a good example of a positive thermoreversible gel former is gelatin. Gelatin is obtained from collagen found in animal tissues, including the skin, tendons, and ossein of bones, by an alkaline treatment (type B gelatin) or acid treatment (type A gelatin). The two types of gelatin have isoelectric points around pH 5, and pH 8-9, respectively. Type A gelatin is almost exclusively produced by treatment of pig skins. In the case of gelatin, for example KNOX gelatin sold directly to the consumer by Knox Gelatin, Inc., Eaglewood, N.J. 07632, the preferable range would be between 1 and 50%, more preferably between 2 and 30%, even more preferably between 4 and 20%, and even more preferably between 6 and 12% in case the egg-yolk is to be stored by itself and added to the egg-white just shortly before cooking the egg. In case that the egg-yolk is to be stored within egg-white, the preferable range is between 2 and 3% so that the yolk will have minimal tendency to absorb water from the egg-white.

Evidently, these ranges will depend on the Bloom value, representing gel strength, of the particular type of gelatin used. Higher bloom values will lower the values of the ranges, while lower bloom values will raise the values of the ranges. The Bloom values or Bloom Grams may be measured with standard in the art methods using a Bloom Gelometer or a Boucher Gelometer. The preferred range of Bloom values according to the present invention is between 200 and 400, while a more preferred range is between 250 and 350, and an even more preferable range is between 300 and 330. Gelatins having a Bloom value considerably lower than about 200 start loosing gel strength, while gelatins of Bloom values higher than about 400 are getting excessively expensive. Another good example of a suitable gelatin is Gelatin E4S from Germantown Manufacturing Co., Broomall, Penna., having a nominal Bloom value of 325. Their Technical Bulletin #85 presents comprehensive information regarding gelatins, especially of Type B.

The Bloom strength usually decreases to a certain degree with decreasing pH under about pH 6. Above pH 6, the gel strength usually remains substantially constant. The lower pH and the higher the temperature the higher the rate of hydrolysis, and therefore, undesirable decrease of gel strength. Thus, high processing times for extended periods of time should be avoided, as well as very low pH values of the gelatin solutions.

Gelatins of both A and B types having Bloom values as low as 50-75 and higher are available from General Foods, Atlantic Gelatin Division, Hill Street, Waburn, Mass. 01801.

When certain colorants, such as for example of the Turmeric type, which are sensitive to high pH, are used in the composition, gelatins providing acidic solutions are preferable, since the pH should preferably be maintained in the vicinity of 5 to 6.5 to avoid color changes.

It should be understood that other gel formers may also be used in conjunction with gelatin or by themselves. Examples of these are gums, such as of the carrageenan type, among others. Since most of the gel formers other than gelatin have higher melting points as compared to gelatin, these gel formers are preferably used either in combination with gelatin when low viscosity, such as for example "sunny side up" or "over easy" egg-yolks are desired, or by themselves, when high viscosity, such as for example "over medium" egg-yolks are desirable. A large number of gel formers having proprietary compositions are sold by different vendors. Regardless of their compositions they may be used within the scope of this invention.

Positive non-reversible gel formers, if used, should be employed in preferably rather small amounts and for preferably high viscosity, such as for example "over medium" yolks. Non-reversible gel formers are usually cross-linkable polymeric entities, such as for example pectins and alginates, among others. These are usually cross-linked with multivalent cations, such as for example calcium, aluminum, and the like, among others. Obviously, rather low cross-link densities provided by lower amounts of cross-linker are preferable in the case of low viscosity yolks, while higher cross-link densities provided by larger amounts of cross-linker are preferable in the case of high viscosity egg-yolks. The appropriate cross-linkers in the appropriate amounts may be provided for example as additives, in the form of a metal salts for example, such as calcium chloride, calcium sulfate, aluminum sulfate, and the like. Proprietary formulations, already containing the cross-linker along with other adjuncts, are also available from a large number of Suppliers of Food Ingredients. Care should be taken when formulating to take into account cations coming from other sources, like milk for example, which if used may provide calcium ions. Sequestrants, preferably of the phosphate type may be also used to delay gel formation and provide better control.

The above difficulties make the thermoreversible gel formers considerably more desirable than the non-reversible ones, as far as this invention is concerned, although even the non-reversible gels used in small amounts are within the limits of the instant invention.

A good reference for locating Suppliers regarding these and any other food ingredients is Chilton's "Food Engineering Master", published by Chilton Co., 1330 Avenue of the Americas, New York, N.Y. 10019. It is evident that all materials used for the compositions of the present invention must be of food-grade, and that good manufacturing practices should be employed.

As aforementioned, the viscosity modifier, comprises preferably a gel former. Thus, in a limiting case, the viscosity modifier may even be substantially a simple viscosity builder. It is important that it is used in an amount adequate to raise the viscosity high enough so that the resulting egg-yolk does retain its monolithic structure in a separate phase within liquid egg-white. Starches and gums in general are examples of viscosity builders, which however does not exclude them from being in certain occasions also gel formers. The important difference that a thermoreversible gel former as compared to a simple viscosity builder may provide to the egg-yolk is that the gel former gives a more sudden viscosity change around a temperature range called gel or melting point, while the latter lacks such a well defined point, and the viscosity changes are more gradual. However, all inbetween situations may exist, and in some occasions, the distinction of whether a substance is a simple viscosity builder or a gel former may become less clear. Regardless of the category that the viscosity modifier may be chosen to be classified to, its content in the egg-yolk composition should be high enough to preserve the monolithic structure of the yolk within the liquid egg-white, and also it should be low enough to allow the egg-yolk to become flowable at least temporarily during cooking.

The preference of using a positive thermoreversible gel former in this respect, instead of a simple viscosity builder is that for the same structural integrity of the yolk in the egg-white during storage and before cooking, the viscosity at consumption temperatures after cooking may be arranged to be much lower in the former case. This gives better control of the flowability of the egg-yolk at consumption or serving temperatures, since the low viscosity may be increased to any desired level by adding an appropriate amount of a simple viscosity builder. Thus, a combination of a positive thermoreversible gel former with a simple viscosity builder gives a broader latitude of formulating an egg-yolk capable of a monolithic structure within the egg-white, followed by controllable flowability during consumption of the egg, and it is highly preferable. An important advantage of the simulated eggs of this invention is the fact that they may be easily formulated in a way that the viscosity of the egg-yolk does not substantially change with cooking time. This may be easily done by electing not to use thermosetting ingredients in the composition. Thus, the only concern of the cook will be in the cooking of the egg-white, since the yolk will take the pre-designed viscosity, regardless of time of cooking. In this respect, an egg which is supposed to be cooked as an "over easy" egg for example, will never have an overcooked or undercooked egg-yolk. This type of predetermined viscosity and flowability control, also provides the convenience of being able to have the egg-white in bulk packaging, accompanied by individual separate packages of egg-yolks of different types, such as for example "sunny side up", "over easy", "over medium", and the like. This is especially desirable for massive cooking establishments, such as restaurants, hospitals, and the like. The fact that there is no need to watch the cooking time of the yolks (if they do not contain negative non-reversible gel formers), and that turning the eggs over is not needed or desired to achieve the "over-" appearance, is also very helpful.

Examples of gums, which may be used in the practice of this invention are natural gums, seaweed extracts, as well as semi-synthetic gums, such as carboxymethylcellulose and methylcellulose derivatives. More specific examples include locust bean, xanthan, carob, guar, carrageenan, agar-agar, arabic, algin and alginates in general, as well as less common gums, such as ghatti, karaya, tragacanth, Australian, Cape, carmania, gedda, mesquite, mogadore, Persian, shiraz, talha, amrad, angico, apricot, brea, cashew, cebil, cedar, chagual, cherry, damson, jeol, mango, plum, sassa, and mixtures thereof. At any rate, the quality and quantity of a specific gum used in the formulation has to be such that it does not impart undesirable properties, including improper flavor, taste, and the like.

Many times, oils added to the composition along with the gums, tend to reduce the viscosity.

In the case where the egg is to be kept in a frozen state for storage before being consumed, raw-materials imparting as good as possible freeze/thaw stability are desirable. Thus, gelatin, as it provides in addition to the aforementioned advantages, good freeze/thaw stability, is preferable. From the starches, the ones appropriately modified to also contribute to better freeze/thaw stability are also preferable in this respect. Starches with a tendency to gel on the other hand are preferable when no other gel formers are used, or when they are the main contributors to the gel or gel-like formation. Of course, mixtures of the different types of starches may be utilized to attain the desired results within the property modification characteristics of said starches.

One precaution that one has to observe is that the results are not absolutely additive and addition of one ingredient may change certain characteristics of another ingredient. This is more pronounced with proprietary ingredients which may happen to contain materials with antagonistic properties, and which the formulator is unaware of. Many times for example, addition of a viscosity builder, such as a starch for example, may weaken to a certain degree the gel structure of a gel former, such as gelatin for example.

Another class of useful ingredients, which may be utilized for the purposes of this invention are negative gel formers. By the word "negative" it is meant that gel formers in this class form a gel by going from lower to higher temperatures. In a same manner as discussed about the positive gel formers, the negative gel formers may also be subdivided into thermoreversible ones and non-reversible or thermosetting ones. Both types have good utility, depending on the results one would like to achieve.

A good example of non-reversible negative gel formers is that of thermoset protein aqueous solutions, such as for example egg-white. Thus, if an adequate amount of such an ingredient is added to the composition of the egg-yolk, the yolk may finally gel irreversibly depending on the amount of cooking it has been subjected to. This is desirable in occasions when the cooking characteristics of a real egg are to be imitated. In the absence of such a negative non-reversible gel former, the final viscosity of the cooked egg-yolk will be independent of cooking time, as already discussed.

Amounts of egg-white solids (albumin) as low as 2–3% are adequate to provide permanent thermo-gelling properties to the egg-yolk of the present invention. Thus, during the cooking cycle, the yolk of the present invention containing egg-white, becomes initially flowable, but upon further cooking it starts coagulating, until finally it fully solidifies. Albumin in the composition of the yolk of the present invention seems to increase the viscosity/temperature hysterisis loop, and allows the yolk to remain flowable (non-gelled) at room and serving temperatures for longer periods of time after the cooking cycle.

Examples of other ingredients which may play the role of non-reversible negative gel formers, are starches which are insoluble to cold water and they have been added in the formulation without being subjected to gelatinization during the process of preparing the egg-yolk. These starches, assuming that their gelatinization temperature is not higher than the cooking temperature of the egg-yolk, will raise the egg-yolk viscosity on a time dependent basis with respect to cooking. The initial viscosity of the composition will be relatively low due to the fact that the starch will only be dispersed, while when it becomes hydrated and swells or dissolves, the viscosity will rise considerably.

In general, any type of starch may be used in the practice of this invention. The amount and type will depend on the effect to be achieved. Examples of starches are amioca, arrowroot, corn, high amylose, pea, potato, rice, sago, tapioca, waxy maize, wheat, thin-boiling or fluidity starches, oxidized starches, British gums, dextrins, and in general modified starches. A brochure "Staley Food Starches" from A. E. Staley Manufacturing Co., Longhorn, Penna. 19047, provides a representative list of different types of available starches providing different desired sets of properties. Selection of a particular starch from this or other lists of other manufacturers in order to achieve a certain result may be easily carried out by a person of ordinary skill in the art, without undue experimentation.

In contrast to the non-reversible negative gel formers, the thermoreversible ones may provide the egg-yolk with a raised viscosity or even a gel structure at cooking temperatures, in a way that the egg-yolk becomes more rigid and it does not run or spread at such temperatures, while it regains the desired viscosity to be controllably flowable at consumption or serving temperatures. Methyl and methyl hydroxypropyl cellulose are of preference as thermoreversible negative gel formers. Usually, the viscosity of the egg-yolk decreases as the temperature increases in the absence of a proper modification, such as the addition of a negative gel former, for example. An appropriate amount, preferably between 0.1 and 10%, and more preferably between 0.2 and 2%, should be used to achieve the desired result, since an excessive amount extends the high viscosity to the serving range of temperatures, and an inadequate amount is ineffective. When a positive and a negative gel former are used in the same composition, special care should be taken to select the gel points and amounts of the coexisting gel formers such as to avoid undesired results. For example, as higher amounts of the gel formers are used, and their gel points are closer, or even more so when their gel points start overlapping, the temperature range in the available consumption or serving temperature region for easily flowable egg-yolks, such as "sunny side up", and "over easy" becomes narrower, or it is even eliminated completely. However, observing simple precautions as the above, it becomes a minimal task to any person with ordinary skill in the art to select appropriate gel points and appropriate amounts of negative and positive gel formers for achieving a desired result.

In the above discussion, it has been explained how an egg-yolk may be maintained in its monolithic status within the egg-white during storage and handling before cooking. The problem of maintaining further the yolk as a confined entity in the process of cooking and serving is also serious, and it needs special attention, not only in the case when the cooked product has to have a liquid egg-yolk in order to simulate for example a "sunny side up" or an "over easy" egg, and the like, but also in any case that the egg-yolk has to pass through a liquid state.

The mere requirement of this invention of providing an adequately non-flowable character to the yolk for the yolk to preserve its monolithicity at temperatures not exceeding room temperature, also provides the basic conditions to discourage mixing of the yolk with the white even at cooking temperatures, thus promoting the continuation of the monolithicity status at the higher temperatures. This is because as the temperature rises and the egg-yolk starts becoming more flowable, especially in the case of "sunny side up" type of yolks, and therefore it starts loosing its self-containment character, the egg-white starts coagulating, thus undertaking the task of containment of the yolk, at least partially. In the case for example of a fried egg, the coagulation of the egg white will at least form a solid border around a melting "sunny side up" yolk. If the yolk is too thick, it may overflow around this border in the absence of any additional aid. If, however, it is adequately small, it may be restricted, and it may remain as a liquid mass surrounded by the solid coagulated egg-white. Since the top surface of the yolk is not restricted by the white, and the bottom surface may not be by itself strong enough, the yolk usually runs when the egg is being transferred from the fry pan to a serving dish. Of course, the lower the viscosity of the yolk, and the larger the yolk, the higher the probabilities of this to occur. Although this behavior may be considered as acceptable, since even real egg-yolks happen to break and run during this transfer, it is nevertheless undesirable.

A restrictive barrier, for example in the form of a skin, a membrane, a coating, or the like around the egg-yolk, may prevent spreading of the yolk during frying, and running of the yolk during its transfer to a serving dish. An example of a restrictive barrier may be a cross-linked film of an edible resin, such as for example an alginate, a pectin, and the like. A multivalent cation, such as for example calcium or aluminum may be used as the cross-linking agent in the form of a salt. This film may be applied to the yolk by well known to the art techniques rather easily, especially due to the "adequately non-flowable" character of the egg-yolk of the instant invention, which does not require freezing for solidification before such application, which freezing has highly adverse effects in the reproducibility and operability latitude of the application, mainly because of potential re-liquidification of the yolk around its surface, if the temperature of the resin solution is higher than the melting point of the frozen yolk.

The cross-linked film should be strong, continuous, elastic, and thin in order to perform satisfactorily, both structurally and from the consumption point of view. A barrier made according to this general concept may be desirable, since it certainly reduces both the incidence and the degree of spreading and running. However, if it develops even small defects, such as pinholes and the like, or if it ruptures for any reason, which may be realized very easily, especially when the egg is subjected to freezing for storage, in which case there is a high potential of formation of needle-like ice crystallites combined with potential for syneresis and different other ill-effects of the freeze-thaw process, then the effectiveness of the restrictive barrier diminishes considerably.

It has been discovered by the applicant that a different type of a restrictive barrier is unexpectedly highly effective, and it lacks the drawbacks of the barrier just discussed above. Thus, it is a preferable type of restrictive barrier to be used in the preferred embodiments of the present invention.

This type of restrictive barrier may be formed by those hydrateable edible polymeric powdered compounds, or hydrocolloids, which give rise to substantially instantaneous increase in viscosity as soon as they come in contact with and start dissolving in aqueous systems. This enormous increase in viscosity forms a gel-like wall, which resists further dissolution of the compound, and thus it provides a self limiting dissolution behavior. Thus, it was found by the applicant that if such a compound is used to dust or "bread" the yolk of this invention after it has been shaped, and then the breaded yolk is added in the egg-white, an outstanding restrictive barrier is formed. The yolk may be immersed in water or other solution before the breading step, in order to form a liquid layer for wetting the particles of the breading compound. This, however, is not necessary, and it is actually preferable that the moisture provided by the yolk itself is used for this purpose, as it has been found to be not only adequate, but also optimal, since a thin adherent and dry-to-the-touch coating is formed providing the yolk with excellent handling characteristics, since all stickiness is eliminated, and thus even fragile yolk structures may be handled considerably more easily. This coating is also adequate to provide excellent restrictive barrier properties. The amount of the compound adhered to the yolk by the breading process lacking additional wetting, is preferably of the order 0.05 to 0.5, and more preferably of the order of 0.1 to 0.3 grams per disc shaped yolk having a diameter of about 4 cm and a thickness of about 1 cm, or a commensurate amount for yolks having a different volume to surface ratio. When the breaded yolk is added to the white, further hydration occurs and a gel-coating is formed around the yolk. It was unexpected to find out that even after extended periods of time (more than a week) during which the coating was in contact with the white, it did not loose its desired property of containing the yolk during later cooking and transferring. It seems that the gel-like coating, due to its solubility, which although limited it still has a finite value, swells and forms a rather thick gel structure around the yolk and within the egg-white at storing temperatures. Even if this gel structure is somehow punctured, it tends to repair itself because of the finite solubility and gel forming characteristics of the slowly extending barrier. This is a very beneficial behavior for maintaining the integrity of the yolk. During cooking, the gel forms a film or skin, due to water evaporation or other mechanisms. In addition, spontaneous incorporation of egg-white within the outer part of this gel-like barrier provides a thicker, more integral and stronger skin to contain the yolk during cooking and transfer, which still has an excellent mouthfeel. Also, the inner part of the barrier close to the yolk remains denser while the outside part within the egg-white is more dilute, thus providing a more real-looking and better defined skin to protect the yolk during cooking and transfer. Thus, in general, puncturing by crystallites during freezing and thawing or other adverse conditions are of considerably reduced consequence to this novel type of barrier.

Examples of such compounds which form gels of the preferred type as discussed above are locust bean gums, carrageenan gums, carboxymethylcellulose, methyl cellulose, methyl/hydroxypropyl cellulose, xanthan gum, and the like, among others.

Among the hydrateable edible polymeric powdered compounds, or hydrocolloids, which give rise to substantially instantaneous increase in viscosity as soon as they come in contact with and start dissolving in aqueous systems, and which are as aforementioned useful in the preferred embodiments of the present invention, there are a few, such as gelatin, which if at all are marginally effective, due to the extremely high drop in viscosity between storing and cooking temperatures as well as the huge increase in their rate of dissolution, respectively, both of which are detrimental for the retention of the barrier. Simple experimentation as given in the examples which follow may accurately determine the effectiveness of any such compound, depending on the intended end-use.

Another class of similar compounds, which however, do not form gels spontaneously at storing temperatures, but only at higher temperatures, are also useful, although they are effective only for shorter periods of time. Examples of such compounds are cold-water insoluble starches, which gelatinize at cooking temperatures. They are capable of providing very clear skins for egg-yolks to be used as in the form of "sunny side up" under certain circumstances as demonstrated in Examples given hereinbelow.

The use of water-soluble compounds to form a barrier, especially with self-repairing properties, in a water-based system, such as the egg-white, without any cross-linking or other permanently insolubilizing mechanism is admittedly a highly unexpected phenomenon. In any event, the explanations given above are only speculative and must not be construed as restricting in any way the scope of this invention. It is only of importance that this type of barrier configuration gives highly improved performance as compared to conventional methods.

In addition to the aforementioned types of barriers, which are useful mainly for the containment of the egg-yolk, other types may also be employed by the present invention to perform other functions, such as for example decrease of the rate of exudation of ingredients from the yolk, such as for example a water based colorant in certain instances. It was found, at least in the case of colorant exudation that an effective barrier is a fatty substance which is solid at room temperature. The better performance of the solid may be the result of the higher achievable thickness, the higher resistance in emulsification, and the like.

Use of a colorant is important in the practice of this invention so that there is a distinct visible difference between the egg-yolk and the egg-white. The colorant may be natural or artificial, hydrophilic or hydrophobic, water or oil soluble, or a combination thereof. As aforementioned, water based colorants may present a problem of exudation from the yolk to the white, which exudation, if excessive, may be objectionable. Of course, the degree of exudation is time dependent, so that if the time the egg-yolk stays in contact with the liquid egg-white is limited, the problem is non-existent. The rate of exudation depends on the individual composition of the yolk. Syneresis, which may occur even at room or refrigerator temperatures, regardless of freezing, accelerates drastically this rate, since the water diffusing out of the gel system transfers along with it large amounts of colorant. Gelatin based compositions are in general considerably better in this respect than most other gum-alone or starch-alone based compositions.

For water based colorants, the time the egg-yolk is in contact with liquid egg-white is of substantial importance. During the period of time at which the egg is frozen, substantially no exudation occurs.

Examples of water based colorants are the FD&C yellow #6, red #40, as well as blue, and green, among others.

Without the use of special barriers, exudation of water-based colorant may become objectionable within three days, when the egg-yolk containing the colorant is in continuous contact with the egg-white. Thus, water based colorants should be avoided when the yolk and white are to be together for extended periods of time. The reason why they are preferable if they may be used, is that they give a brighter and clearer color, they are directly soluble in the system and they do not need emulsification, as well as they are considerably more stable regarding both UV radiation and pH.

When the exudation of water-based colorants becomes a problem, oil soluble colorants are of preference, since when emulsified in the egg-yolk composition, no exudation occurs for all practical purposes. It seems that the considerably bigger oil-in-water droplets, having a much lower rate of diffusion than the intimately dissolved colorants, do not exudate in appreciable amounts within the time periods involved in this application, when the yolk is in contact with liquid egg-white.

Examples of oil soluble colorants are different carotenoids, annatto, as well as Turmeric colorants. These colorants are sensitive to UV light, and therefore, when used, appropriate precautions should be taken, such as avoiding clear containers, and the like, if the products are to be exposed to light for extended periods of time. Turmeric has a yellow color is also partially water soluble. It may be used by itself, or preferably in combination with a redder colorant, such as a carotenoid, for example. When Turmeric is present, it is preferable that the pH of the egg (the yolk, the white, or both) is adjusted to a value lower than 8, preferably lower than 7, and even more preferably between 5 and 6.5, to avoid discoloration towards brawn. When the pH of the white is adjusted to lower values than those of the natural egg-white, some destabilization of the white may occur, resulting in a crumbled texture during cooking, especially poaching. In order to diminish this problem, a stabilizer may be added to the white, such as starch for example. It is preferable that the stabilizer is first added to the egg-white, and then the pH is lowered. Solutions of citric acid or any other edible acids, at least in small quantities, may be used for this purpose. Lemon juice is a natural acidic source, which may also be used.

Also, turmeric may be used in combination with stable yellow water soluble colorants in order to compromise and beneficially optimize the effects of discoloration, pH destabilization, and color stability.

Another example of an oil soluble colorant that may be used is extract of plant xanthophylls, available as PIGMENTENE yellow-gold.

A combination of yellow and red colorants is preferable for achieving a more realistic egg-yolk color.

Colorants different than those composing a color similar to that of an egg-yolk may be used for special effects, to make for example "novelty" eggs having green yolks for Saint Patrick's day, or eggs with multicolored yolks and/or flavors for children, and the like.

The amount of colorant in the composition depends on the strength of the particular colorant, as well as on the desired strength of the color in the final product.

A number of egg-flavors are available in the market which resemble more or less the flavor and taste of the egg-yolk. It is interesting to note that the applicant has found that even the absolute absence of additional egg flavor in the egg of this invention is acceptable. The flavor of the egg-white is in most cases adequate to give the impression to a person eating a fried egg, for example a "sunny side up" egg of the present invention that the egg is a real one. The flavor of the oil also helps in the formation of this impression, since even in the case of real eggs, the egg-yolk flavor is covered by the flavors of the egg-white, the oil, condiments, and the like. However, it is preferable to use in the egg composition a small amount of light flavor, such as used for example in Example 22. Flavor enhencers may also be used, such as for example monosodium or monopotassium glutamate, disodium or dipotassium inosinate, disodium or dipotassium guanylate and the like, as well as mixtures thereof.

Oils, preferably unsaturated vegetable oils, may be used to complement the composition of the egg yolk, if so desired. Lecithin may also be used as a supplement and to reduce stickiness. Examples of oils are cottonseed, safflower, corn, soybean, peanut, sunflower, olive, sesame, rape seed, and the like. The oils may also be used to dissolve oil-soluble colorants. Evidently, partially or fully hydrogenated oils or fats of synthetic or natural origin may also be used, but they are undesirable from the health point of view.

Emulsifiers may be also used for emulsifying the oils or for any other purposes. Usually, when milk solids are present, they may be used as an emulsifier for the oil or other hydrophobic substances. The common food grade emulsifiers, such as for example polyoxy alkylene mono and diglycerides, sorbitan monostearate, dioctyl sodium sulfosuccinate, polyoxyethylene sorbitan fatty acid esters, and the like may be used. The amount of emulsifier may vary from about 0.1% to about 10% based on the total composition of the yolk, preferably between 0.2% and 3%, and even more preferably between 0.5% to 1.5%

Milk, preferably of the low-fat type, and more preferably of the non-fat type may be used as an additional ingredient in the composition of the yolks of the present invention. It provides flavor, texture, some opacity, and it may decrease syneresis or water separation. It is also an additional source of protein. The preferred range of milk solids by weight in the total egg-yolk composition is between 1% and 20%, more preferably 5% to 15%.

Use of whey protein, preferably of the "ultrafiltration" type may be made to replace partially or totally the albumin of the egg-white, but it may also be added in the composition of the simulated egg-yolk of this invention.

Miscellaneous other ingredients, such as vitamins, minerals, stabilizers, antioxidants, opacifiers, and the like, well recognized and utilized in the art of food products may also be used to impart the respective desirable functions. These may for example include such compounds as aluminum sulfate, ferric orthophosphate, thiamine mononitrate, riboflavin, vitamin D2, and the like.

Pasteurization of the simulated eggs of the instant invention should be conducted to meet Government specifications regarding microbe content. Salmonella bacteria are of great concern. It is preferable that the egg-whites are pasteurized separately, and that the egg-yolks are pasteurized before they have been shaped. Pasteurization techniques are given in the "Encyclopedia Of Chemical Technology", Kirk Othmer. John Wiley & Sons, Vol. 8, pp. 429–445, the text of which is incorporated herein by reference.

A pasteurization technique is also described in U.S. Pat. No. 3,251,697 to Lineweaver, which is also incorporated herein by reference.

Evidently, if the egg-yolk of this invention does not contain any negative non-reversible gel formers, it may be pasteurized at higher temperatures for shorter times. The general processing of the egg-yolk mixture of the ingredients may provide by itself adequate pasteurization of said mixture.

The preferred egg-yolk of this invention is in the form of a disc. However, any other shape, including the spherical shape of a real yolk, lies within the scope of this invention. The disc-like shapes are preferable, because upon cooking such as frying for example, it is easier to avoid spreading and running of an egg-yolk having a flattened shape, such as the shape of a disc.

The dimensions of the disc are also important. In general, the thicker the disc the higher the potential of the yolk to spread during frying, especially if no restrictive barrier is present.

Unless a special effect is desired regarding the dimensions and generally the appearance of the simulated egg-yolk, the following hold valid.

The ratio of the diameter to the thickness should preferably be larger than 1, more preferably 2-6, and even more preferably 3-4. If the ratio is less than 1, the disc may be considered to be a cylinder rather than a disc, and when cooked it is very likely that it will fall on its side. The diameter of the disc should preferably be 20-70 mm, more preferably 25-55 mm, and even more preferably 30-45 mm. A diameter smaller than 20 mm provides an unrealistically small looking yolk, while a diameter larger than 70 mm renders the egg-yolk unrealistically large-looking. The thickness should preferably be 4-20 mm, more preferably 5-15 mm, and even more preferably 10-15 mm. Yolks thinner than 4 mm look unrealistically small, while thicker than 20 mm are more difficult to warm adequately, especially their central part in order to achieve the desirable and uniform flowability during frying, they have higher potential of spreading during cooking, as well as they are easier to run during being transferred from the pan to a serving dish.

Special effects may be achieved by using other shapes than discs. Examples are heart-like shapes, butterfly-like shapes, face-profile shapes, and any other type of preferably flat shapes. Of course these may be combined with different colors to enhance the effect, if so desired. A good example may be that of an egg according to this invention, with a heart-shaped cholesterol-free yolk to symbolize the advantage of the simulated egg in saving the heart of the person who consumes such an egg.

The individual monolithic portions of the egg-yolks may be made in a number of different ways. Preferred ways are by:
- casting the egg-yolk composition into a sheet, lowering the temperature of the sheet adequately to solidify or gel it, and cut the particular shapes. The remains of the sheet after the cutting operation, may be recycled, especially if no negative gel formers and especially of the non-reversible type, as earlier defined, are not present in the egg-yolk formulation;
- casting the egg-yolk composition into forms or molds, lowering the temperature of the forms or molds adequately to solidify or gel the individual portions, and remove them from the forms;
- casting the egg-yolk composition into an oblong mold, lowering the temperature adequately to solidify or gel the cast composition, removing from the mold, and slicing into individual monolithic portions; and
- extruding the composition linearly in a continuous way through a shaped die, and after cooling and firming the structure, slicing the monolithic portions.

In addition to the above, when the portions are to be formed into discs, small blobs of egg-yolk composition may be extruded onto a flat cold surface, then compressed by another cold, flat surface to a desired thickness, allowed to cool until the discs solidify or gel, and finally removed. The cold plates may be parts of continuous belts passing together through a cool zone, in a manner similar to that described in U.S. Pat. No. 4,780,328 (Akesson et al.), with the difference that both belts would preferably have parts both within and outside the cool zone, with the extrusion of the composition taking place outside the cool zone.

As aforementioned, in certain occasions it is preferable to have yolks with a special disc form, wherein the disc comprises two portions, a central portion and a peripheral portion. The peripheral portion is adequately less-flowable than the central portion in order to prevent the central portion from spreading during cooking. This configuration may be used, if so desired, in combination with the restrictive barrier for additional protection against spreading and running of the yolk. It is preferable that the ratio of the outside diameter of the peripheral portion to the diameter of the central portion to be between 2.9 and 1.1, and more preferably between 1.4 and 1.2.

Such configurations of egg-yolks may be made by a number of ways, such as the ones described above for the single-flowability yolks, with the difference that a doughnut shaped structure, corresponding to the peripheral portion, and a filling within the peripheral structure, corresponding to the central portion, are formed simultaneously, by co-extrusion for example, or in sequence, the peripheral portion being preferably formed first. In one example, the doughnut shaped peripheral portion may be formed first by any technique, and then filled with the central portion.

Of course, it is always desirable for any yolk as a total structure, regardless of its configuration, to have also adequate flowability in order to round up at cooking temperatures any imperfections, such as sharp edges, or other abnormalities, as well as also attain a natural-looking curvature within the egg-white.

Sharp edges of the egg-yolk may be rounded off, if desired, also during manufacturing of the yolk. According to this embodiment, the yolks are passed through warm or hot liquid, preferably water, having a temperature high enough to start melting the yolk, which results in dissolving any sharp points on the surface of the yolk. When the desirable degree of roundness has been achieved, the yolk is preferably immersed in cold, and more preferably in a chilled liquid, preferably water, wherein it stabilizes its shape, and then it is treated according to any of the embodiments or other methods included within the limits of this invention.

Depending on the ingredients selected for a given desirable behavior of the egg-yolk of this invention, a suitable method should be used to ensure harmonious incorporation of said ingredients into the composition. Any person with ordinary skill in the art may easily decide on a proper sequence of addition, as well as conditions of the process in order to achieve good mixing and incorporation of the ingredients into the composition without undesirable effects. Very helpful to this task are different brochures from the vendors, which provide information relative to the behavior of the ingredients. For example, nothing more than common sense is required for one to realize that if egg-white is added in the egg-yolk composition, the addition and any further processing should take place at low enough temperatures and processing times in order to avoid coagulation or gelation of this particular egg-yolk. Similar considerations are valid for the addition of starch when it is added to gelatinize at cooking temperatures of the yolk and thus raise the viscosity of the yolk with time.

As aforementioned, packaging of the eggs of the present invention is of importance. Since each portion has one yolk and the corresponding quantity of egg-white, it is preferable that they are packaged in individual packages, each package containing one portion. This, of course, does not exclude the possibility of packaging the eggs in multiportion packages.

In order to be economical to package the eggs of this invention in individual packages, the packaging methods, packaging materials, and packages themselves have to be inexpensive. It is well known that one of the most inexpensive categories of packaging is the one involving heat sealable, single-ply polyethylene film of an adequate thickness. Typically, multi-ply films are used for an enormous number of applications, as these applications are rather demanding in gas and liquid permeability, as well as a plurality of other properties. In the case of the eggs of the present invention, however, the product will mostly be stored, distributed, and sold in the frozen state; it will stay in an unfrozen state as a liquid only for short periods of time not exceeding a few days. Under these conditions, a pouch made of single-ply polyethylene film gives adequate protection. One of the biggest problems of these inexpensive packages, however, is that they are not convenient for packaging liquids, since there have been so far no satisfactory ways of opening the package in order to dispense the contents. Two disclosures have leaned toward acceptable solutions, and they may be used for packaging the products of the present invention, as well as other egg-products. However, they are still not satisfactory.

As aforementioned, U.S. Pat. No. 3,456,867 (Repko) discloses a bag assemblage comprising a gusset (inverse fold) across an edge of the bag and a weakened tear line within the gusset. However, the ways proposed for forming the weakened line, such as scoring by pressure or heat or using multi-ply structures, where one ply has been weakened along the tear line, are either non-reproducible or expensive respectively. U.S. Pat. No. 3,652,006 discloses a flexible package having a pleat formed along one edge to provide a pair of adjacent outwardly extending and readily graspable folds. The folds are reinforced by stiffening strips or by adhesive material, except along the fold line between the folds, so that when the folds are grasped and pulled apart the package will tear open along the fold line between the reinforced folds. One big problem that this approach confronts, is that the whole package has to be made of rather thin packaging material for the fold line to be easily tearable.

The pouch provided by the present invention is inexpensive, strong, convenient, and easily openable, among other desirable characteristics. It may be used very conveniently with the egg products of this invention, as well as any other appropriate item.

FIGS. 1a (front view) and 1b (magnified cross section across line A—A) show a flexible pouch 10 according to the present invention. The flexible pouch 10 comprises in combination an assembly of a first side wall 12, a second side wall 14, and an edge wall 16. The flexible pouch 18 has a cavity 18 confined by the first side wall 12, the second side wall 14, and the edge wall 16 for packaging an item, such as an egg, for example. The first and second side walls 10 and 12 respectively, have common ends 20, and a first thickness 22. The edge wall 16 has a length 24, a width 26, and a second thickness 28. The edge wall 16 is sealed on each of the first and second side walls 12 and 14, respectively, so as to form two adjacent substantially parallel seals 30 and 30', respectively, at an additional non-common end 32. As better shown in FIG. 1b, the parallel seals 30 and 30' are separated by the edge wall 16.

The width 26 of the edge wall 16 should be narrow, preferably in the range of 0.1 and 5 mm, more preferably in the range of 0.1 and 1 mm, and even more preferably in the range of 0.1 and 0.5 mm. It is important for the edge wall width 26 to be as narrow as possible so that linear tearing along the length 24 of the edge wall 16 may take place without excessive stretching before tearing. If, however the width 26 is less than 0.1 mm, the two parallel seals 30 and 30' may overlap partially or totally, because of inacurate registration of the sealing machine, or because of inacurate heat control, or for other reasons, and make the intended tearing mechanism inoperable.

The first side wall 12 and the second side wall 14 extend beyond each respective parallel seal 30 and 30', so as to form a first flap 34 and a second flap 36, correspondingly. The first flap 34 has a first flap width 38, and the second flap 36 has a second flap width 40. Although the two widths 38 and 40 may be substantially equal to each other, it is preferable that the first flap width 38 be larger than the second flap width 40 for easier manipulation when the pouch is to be opened.

The second thickness 28 is adequately smaller than the first thickness 22, so that when a manual pulling-apart force F is applied on the flaps 34 and 36, the edge wall 16 breaks along its length 24 between the parallel seals 30 and 30' without the break being propagated beyond the parallel seals 30 and 30'. The values of thicknesses 22 and 28 depend on the materials. In the case of polyethylene, for example, when the flexible pouch is to be used for packaging the eggs of the present invention, the first thickness is preferably in the range of 25 to 250 micrometers, more preferably in the range of 50 to 125 micrometers, and even more preferably in the range of 60 to 80 micrometers, while the second thickness 28 is preferably in the range of 5 to 50 micrometers, more preferably in the range of 12 to 25 micrometers and even more preferably in the range of 15 to 22 micrometers. In addition, the second thickness 28 should be equal to the first thickness multiplied preferably by a factor of 0.9 or less, and more preferably by a factor of 0.5 or less.

The flexible pouch 10, when completed, has also a left seal 42, a right seal 44, and a bottom seal 46, which bottom seal as it will be seen in different embodiment, may be replaced by a U-fold. All three seals are common to the first and second side walls 12 and 14.

The pouch 10 may be easily opened by grasping the flaps 34 and 36 in approximately their middle region and pulling them apart. This pulling action breaks the edge wall and tears it along its length 24, without any tearing being allowed to take place beyond the seals 30 and 30'.

As aforementioned, it is preferred that the item to be packaged comprises a flowable material, which even more preferably is an egg-product. This is because this type of a pouch is convenient, adequate, inexpensive, and for a plurality of other reasons already discussed.

As also discussed above, it is preferable that the first side wall 12, the second side wall 14, and the edge wall 16 comprise a thermally sealable material, which is preferably polyethylene.

Since products, such as for example the egg-products of the present invention may be even cooked in the flexible pouch, by boiling in water for example, and even more so in the case of egg-products, which are notorious for wetting and sticking onto surfaces, it is preferable that the portions of the walls confining the cavity have been treated with a release material, such as silicones, fluoropolymers, and the like. One of the preferred release materials is polytetrafluoroethylene, not only because of its low surface energy, and excellent release properties, but also because of its property to be transferred in minute quantities onto any surface that it is rubbed upon, thus forming extremely thin coatings, approaching the dimensions of monolayers.

Thus, an extremely thin coating of polytetrafluoroethylene may be applied on one side of the packaging film by passing said film in a rubbing mode over a polytetrafluoroethylene roll turning preferably in an direction opposite to that of the film. It is important to note that the heat sealing properties of the film, for example polyethylene, do not suffer appreciably from such a treatment.

Figure 3:
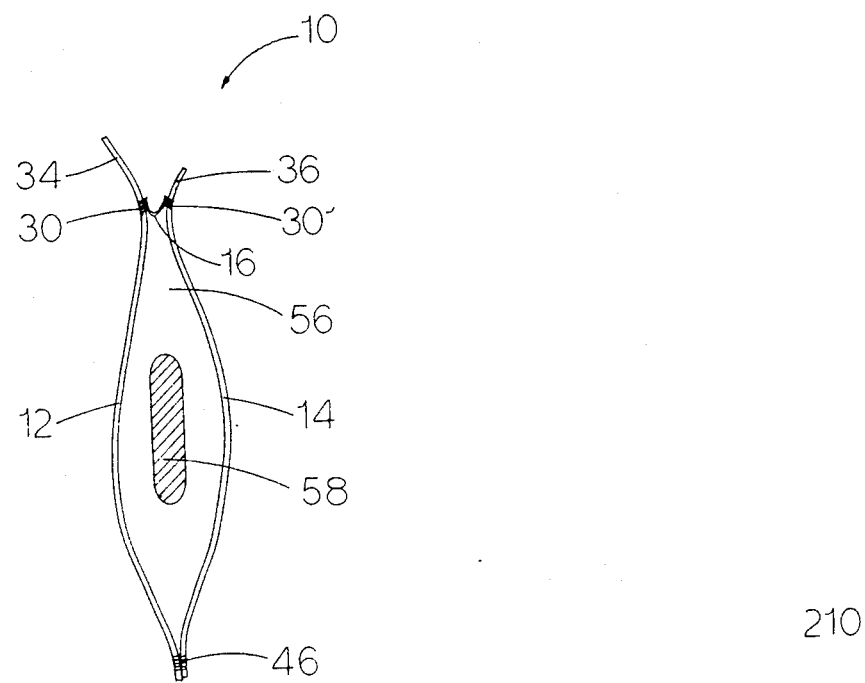
FIG. 3 shows a flexible pouch filled with an egg according to this invention.

Referring now to FIG. 3, a cross section of flexible pouch 10 is shown, containing egg-white 56, and a simulated egg-yolk 58. The egg-product shown in the flexible pouch 10, may be subjected to freezing, thawing, boiling in water, and the like, while it is still in the pouch. Otherwise, the pouch may be opened as described above, the egg-product removed, and cooked in any conventional manner.

Figure 1B:
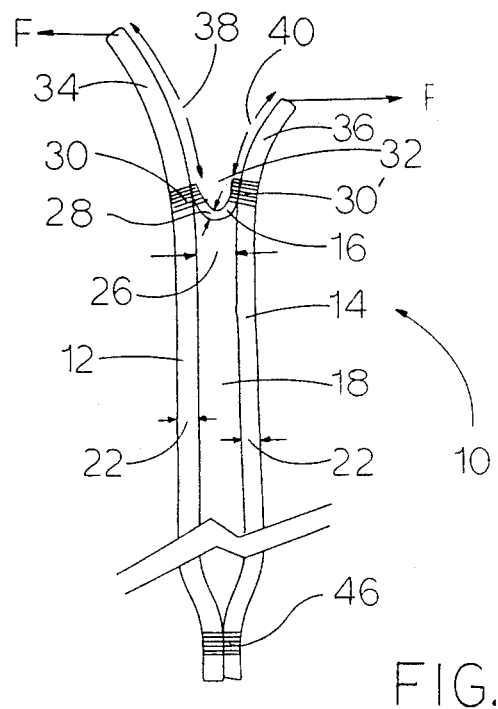
FIG. 1b is a magnified cross section of the flexible pouch of FIG. 1.
Figure 2:
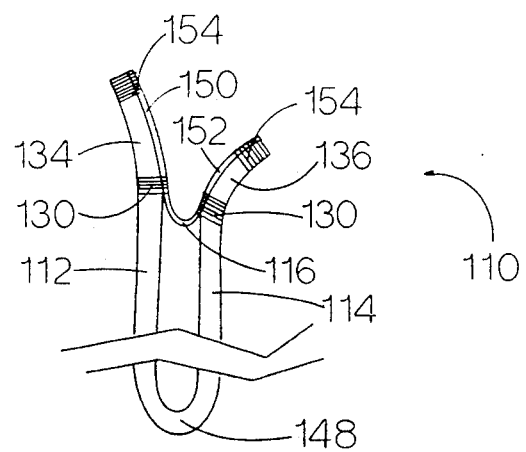
FIG. 2 illustrates a cross section of a different preferred embodiment of the flexible pouches of this invention.

In a different embodiment of this invention, better shown in FIG. 2, the bottom seal 46 shown in FIGS. 1a and 1b has been replaced by a U-fold 148. Thus, the two side walls 112 and 114 Of pouch 110 are an integral film folded on U-fold 148. Also the edge wall 116 may be continued to a first extension 150, and a second extension 152, over the flaps 134 and 136, respectively. Extensions 150 and 152 may be further secured to the respective flaps 134 and 136 through upper seals 154.

Figure 4:
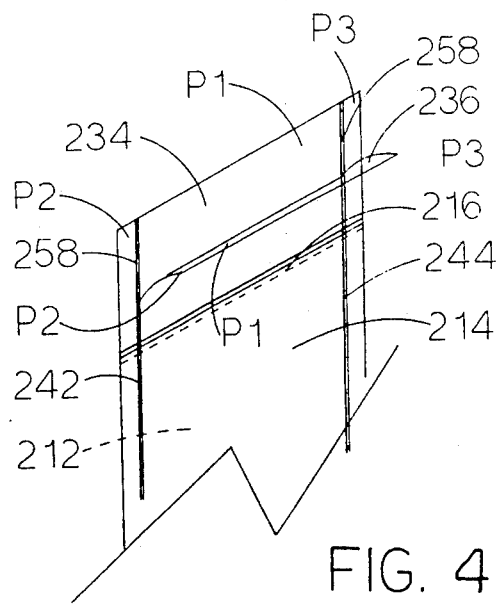
FIG. 4 shows a fragmental prospective view of another preferred embodiment regarding the pouches of this invention.

FIG. 4 illustrates still a different embodiment of the present invention. Second flap 236 has been partially separated from the first flap 234 by cuts 258 along the upper portions of seals 242 and 244. This arrangement enables the user of the pouch 210 to open either the upper part of the pouch by just tearing the edge wall 216, or open it completely by tearing wall 214 apart from wall 212, along the left seal 242 and the right seal 244. It was found that if the user applies the pulling-apart opening forces at positions P1, only the wall 216 is torn. In order to open the pouch further, pulling-apart opening forces have to be applied in positions P2 and P3. This is a very useful arrangement because in the case of having an egg package for example, if the user or consumer wants to cook the egg in a conventional way, he or she may just open the upper part of the package and remove the flowable egg. On the other hand, if the consumer wants to boil the egg in the package, he or she may do so, and then open the package completely by first applying pulling-apart forces in position P1, and then in positions P2 and P3, in order to remove the solidified boiled egg.

In another embodiment of the present invention, polymers having linear tear properties as described in U.S. Pat. No. 4,098,406, which is incorporated herein by reference, may also be used. These polymers are mixtures of polyethylene and ionomer resins as described in U.S. Pat. No. 3,264,272, which is also incorporated herein by reference. These mixtures are extruded to make films having excellent linear tear properties in the direction of extrusion. Such films may be used for at least some of the walls of the flexible pouches of the instant invention. It is preferable that the edge wall 16 has linear tear properties along its length 24. The larger the width 26 of the edge wall 16 the more desirable the use of polymers with linear tear properties in the construction of wall 16. It is also preferable that the side wall 214 has linear tear properties along the direction of the left side seal 242, and the right side seal 244.

Any conventional method of making, filling, and sealing the pouches of the present invention may be used. A simple way is to use three continuous foil strips, such as for example the ones representing the walls 12, 14, and 16 in FIGS. 1b, and feed them through a sealer/filler, where the continuous seals 30, 30', and 46 are made. The cavity 18 is filled with any desirable contents, and then seals 44 and 42 are made. This operation continues and a train of filled pouches is being created. In a similar manner, a strip folded through U-fold 148 as the one represented by the walls 112 and 114 may be sealed to a strip represented by edge wall 116 (FIG. 2), and then filled and further sealed as in the previous case. The pouches may remain in sets of a desired number of pouches, with perforated lines or other tearing configurations from pouch to pouch, or they may be cut to individual pouches, which is preferable. A different way is to make first seals 30, 30', 42, and 44, fill the pouch through the bottom common end 20, and then make the bottom seal 46. Again the pouches may be made in sets or individually.

In the case that the flexible pouches comprise walls made of polymers having linear tear properties, provisions have to be made, so that the linear tear directions are properly oriented.

Another way to avoid streching of the edge wall 16 during opening the flexible pouch 10 is to pre-strch the film which is to be used for making the edge wall 16 in a direction parallel to the width 26 of this wall.

In order to facilitate initiation of tearing of the edge wall 16 by pulling the flaps 34 and 36 when it becomes desirable to open the pouch, the film which is used to construct the edge wall 16 is wrinkled before it is sealed on the side walls 12 and 14. The intersept points of the plurality of randomly distributed wrinkles with the parallel seals 30 and 30' form weaker regions promoting controlled initiation of tearing upon pulling apart the flaps 34 and 36.

Although single-ply low density polyethylene films in their pure form or modified with vinyl acetate are preferred because they are inexpensive, other films such as for example comprising isobutylene, polyvinylidene chloride, polyvinyl chloride, ionomers, as well as mixtures thereof, and the like may also be used. Other films also include all well known single- or multi-ply films, well known to the art of the packaging industry.

It should be noted that numbers differing by multiples of 100 utilized in the drawing to describe the different embodiments of this invention, represent the same elements, intended to perform substantially the same functions, and should be used as such for a better understanding of the different aspects of the instant invention.

GLOSSARY

ARGO Corn Starch—Sold in supermarkets as "ARGO pure corn starch", from Best Foods, CPC International, Inc., Eaglewood, N.J. 07632.

Artificial Egg Flavor—#27633 Spray-dried, from Food Materials Corp., 2711 West Irving Park Road, Chicago, Ill. 60618.

Carotenal Solution #73—1.4% beta-apo-8'-carotenal plus 0.6% beta-carotene from Roche Chemical Division, Hoffman-La Roche Inc., Nutley, N.J. 07110.

CMC Type 7LF—Carboxymethylcellulose, low viscosity, from AQUALON, 2711 Centerville Rd., PO Box 15417, Wilmington, Del. 19850-5417.

CMC Type 7MF—Carboxymethylcellulose, medium viscosity, from AQUALON, 2711 Centerville Rd., PO Box 15417, Wilmington, Del. 19850-5417.

CMC Type 7H4F—Carboxymethylcellulose, high viscosity, from AQUALON, 2711 Centerville Rd., PO Box 15417, Wilmington, Del. 19850-5417.

CRISCO SHORTENING—From Procter and Gamble, Cincinnati, Ohio 45202.

DREWMULSE 8731-S—CAS#68512-92-5, emulsifier, from Stepan Co., 100 West Hunter Ave., Maywood, N.J. 07607, EGG-WHITE POWDER—Egg Albumin, Lot 25342, from Penta Manufacturing, East Hanover, N.J. 07936

FREEZIST M Starch—Modified tapioca starch from A. E. Staley Manufacturing Co., Decatur, Ill. 62525.

Gelatin E4S—325 Bloom powdered gelatin from GERMANTOWN MANUFACTURING CO., 505 Parkway, P.O. Box 238, Broomall, Penna. 19008.

GENUGEL CARRAGEENAN—From AQUALON, 2711 Centerville Rd., PO Box 15417, Wilmington, Del. 19850-5417.

GENU PECTIN, Type LM 12CG—From AQUALON, 2711 Centerville Rd., PO Box 15417, Wilmington, Del. 19850-5417.

GENU PECTIN Type DD Slow set—From AQUALON, 2711 Centerville Rd., PO Box 15417, Wilmington, Del. 19850-5417.

GENU PECTIN Type BB Rapid set—From AQUALON, 2711 Centerville Rd., PO Box 15417, Wilmington, Del. 19850-5417.

GENUVISCO CARRAGEENAN From AQUALON, 2711 Centerville Rd., PO Box 15417, Wilmington, Del. 19850-5417.

KELTROL—Xanthan gum from Kelco, Division of Merk & Co., Inc., 75 Terminal Ave., Clark, N.J. 07006.

KELGUM—Xanthan and Locust Bean combination from Kelco, Division of Merk & Co., Inc., 75 Terminal Ave., Clark, N.J. 07006.

KELGIN LV— Alginate from Kelco, Division of Merk & Co., Inc., 75 Terminal Ave., Clark, N.J. 07006.

KNOX gelatin—Sold in supermarkets as "The Original Unflavored Gelatin", from KNOX Gelatine, Inc., N.J. 07632.

LEMON JUICE—Sold in Supermarkets as ReaLemon®.

LOCUST BEAN GUM FL 50-50—from AQUALON, 2711 Centerville Rd., PO Box 15417, Wilmington, Del. 19850-5417.

MAXI-GEL 7724 starch—Waxy starch with good freeze-thaw, acid and shear stability from A. E. Staley Manufacturing Co., One Oxford Valley Mall, Longhorn, Penna. 19047.

McCORMICK Red Food Color—A water solution containing propylene glycol, FD&C red #40, FD&C #3 and 0.1% propylparaben (20 drops of solution correspond to about 0.67 gram), sold in supermarkets as "Yellow Food Color", from McCormick & Co., Inc., P.0. Box 208, Hunt Valley, Md. 21030.

McCORMICK Yellow Food Color—A water solution containing propylene glycol, FD&C Yellow #5, FD&C red #40, and 0.1% propylparaben (20 drops of solution correspond to about 0.67 gram), sold in supermarkets as "Yellow Food Color", from McCormick & Co., Inc., P.0. Box 208, Hunt Valley, Md. 21030.

METHOCEL A15LV, A4C, A4M—Methyl cellulose products having a viscosity of 15, 400, and 4,000 mPa.sec, respectively at 2% concentration levels, from DOW CHEMICAL, USA, Midland, Mich. 48674.

METHOCEL K100LV, K4M—Hydroxypropyl/methyl cellulose products having a viscosity of 100, and 4,000 mPa.sec, respectively at 2% concentration levels, from DOW CHEMICAL, USA, Midland, Mich. 48674.

MIRA-SET B starch—Blend of thin-boiling starches from A. E. Staley Manufacturing Co., One Oxford Valley Mall, Longhorn, Penna. 19047.

MOLLY McBUTTER cheese flavor—Sold in supermarkets as "Flavor Sprinkles", from Alberto Culver Co., Melrose Park, Ill. 60160.

Natural Flavor compound (taste of egg)—R-7799/261745 from Haamann and Reimer Corp., Springfield, N.J. 07081.

SOFT-SET starch—Hot process thin-boiling starch from A. E. Staley Manufacturing Co., One Oxford Valley Mall, Longhorn, Penna. 19047.

Stabilizer 931—Mixture of gums from GERMANTOWN MANUFACTURING CO., 505 Parkway, P.0. Box 238, Broomall, Penna. 19008.

Turmeric concentrate #3285— Purified turmeric extract in polysorbate 80 from Warner-Jenkinson Company, 2526 Baldwin Street, P.0. Box 14538, St. Louis, Mo. 63178-4538.

Turmeric concentrate 09744—Purified turmeric extract in propylene glycol and polysorbate 80 from Warner-Jenkinson Company, 2526 Baldwin Street, P.0. Box 14538, St. Louis, Mo. 63178-4538.

Turmeric Oleoresin 03210—8.5% in vegetable oil from Warner-Jenkinson Company, 2526 Baldwin Street, P.0. Box 14538, St. Louis, Mo. 63178-4538.

VARIGEL—Mixture of gums from GERMANTOWN MANUFACTURING CO., 505 Parkway, P.0. Box 238, Broomall, Penna. 19008.

METHOD OF FRYING THE EGGS

During this work, unless otherwise stated, the eggs are added to the fry pan containing hot oil (medium or high setting of the electric heating element). The temperature is maintained this way at such level as to prevent splashing of oil around the pan. Oil is continuously taken from the side of the egg with a spoon and is poured on top of the yolk and the rest of the central areas of the egg, which are necessarily cooler than the edges. The eggs are not turned over unless otherwise stated.

GENERAL COMMENTS

All quantities and percentages are given by weight, unless otherwise stated 20 drops of McCORMICK Yellow or Red Food Color correspond to 0.67 gram.

20 drops of lemon juice correspond to 0.67 gram.

20 drops of Turmeric concentrate #3285 correspond to 0.6 gram.

EXAMPLE 1

The following mixture was heated until it became viscous. Attention was needed to stop heating promptly, because after it started thickening it would not stop easily. The viscous mixture was then cooled to room temperature. After about ½ hour it had been solidified. When it was placed in the refrigerator, it became a very firm gel.

| 1-1 | |
|---|---|
| Low fat milk (2% fat) | 110 cc |
| ARGO Corn Starch | 17 grams |
| KNOX gelatin | 7 grams |
| McCORMICK Yellow Food Color | 20 drops |

Pieces from the gel were added in egg-white, and placed in the refrigerator for 24 hours. As far as one could judge without side to side comparison to a control, no exudation of the colorant from the simulated yolk to the white had occurred.

The egg was then fried in oil. The yolk melted, and collapsed. The final appearance was like that of a real fried egg with a broken yolk. The egg-white was completely solidified, while the yolk was still somewhat liquid.

Although no flavorings or other adjuncts had been added in the yolk composition, when eating the fried egg, one could bet that it was real. The taste, texture, color, mouthfeel, and general appearance of the simulated egg were excellent.

Among other obvious teachings, this example demonstrates that addition of egg-yolk flavor is not as important as one would think, probably because during eating a fried egg, the yolk flavor, even in a real egg, does not drastically and distinctly contribute to the overall flavor and taste provided by the egg-white, the oil, any condiments present, such as salt and pepper, and the like. Thus, the appearance and mouthfeel of the yolk, within the white, become more dominant than the flavor for a better simulation.

EXAMPLE 2

The following were made:

| 2- | -1 | -2 | -3 |
|---|---|---|---|
| Low fat milk, 2% fat (cc) | 110 | 110 | 110 |
| ARGO Corn Starch (grams) | 17 | 17 | 34 |
| KNOX gelatin (grams) | 7 | — | — |
| McCORMICK Yellow Food Color (drops) | 20 | 20 | 4 |
| McCORMICK Red Food Color (drops) | — | — | 5 |

The above were mixed under heating, as in the case of example 1. They were then poured into an ice-cube tray, in five cavities in each case, and placed in the refrigerator. They were checked in two hours. 2-1 was a very firm gel, while 2-2 and 2-3 were structurally very weak gels.

A cube of 2-1 was weighed, and found to be 20 grams (a real egg-yolk from a "Jumbo" egg was 19 grams). It was put in egg-white for 24 hours. No signs of disintegration were observed during this time period. No exudation was observed in cubes placed in the refrigerator by themselves.

Cubes corresponding to compositions 2-2 and 2-3 were also put in egg-white and then in the refrigerator. When inspected in 8 hours, they seemed that they had started deteriorating structurally. Cubes placed by themselves in the refrigerator developed some exudation of a colored liquid.

When fried in oil, the best texture, by far, being creamy, was that of 2-1, while 2-3 was considerably inferior, and 2-2 inbetween, both with grainy texture.

The above indicate that the combination of a separate positive thermoreversible gel former, such as gelatin, with a separate viscosity builder, such as starch, gives better end-results than when a single component is assigned to play the role of both the gel former and the viscosity builder. Although starch has gel forming properties, gelatin provides considerably stronger gels at low temperatures. Under the same token, starch provides better viscosity control at cooking and serving temperatures.

When eggs corresponding to 2-1 and -2 yolks were scrambled and fried, they attained sticky structures. 2-2 was somewhat less sticky than 2-1. However, both were non-uniform and they were broken into small pieces.

An egg corresponding to the yolk composition 2-1, after being fried in a "sunny side up" manner was put in the refrigerator overnight. When examined after this period of time, it gave the appearance of a well cooked egg, since the egg-yolk had been gelled. When it was then put in a microwave oven at 55% power for 45 seconds, it regained its creamy texture. 15 minutes after it was removed out of the oven, most of the creamy texture was still present, although the yolk had started thickening. Thirty minutes later, considerable thickening had occurred, but there was still some of the creamy character left. This shows clearly the thixotropic character imparted to the yolk, which this invention takes advantage of.

After a large number of experiments, optimum results were received with composition 2-1, when the egg-yolk was shaped in the form of discs having a diameter of about 3.75 cm and a thickness of about 1 cm.

EXAMPLE 3

All solids shown below were mixed together, and the water was added slowly. Finally, the color was added, and the mixture was heated until a creamy consistency was obtained. It was then casted in a flat mold, approximately 16.6 cm × 11.4 cm and placed in the refrigerator.

| 3-1 | |
|---|---|
| Non-fat dry milk powder | 10 grams |
| ARGO Corn Starch | 15 grams |
| KNOX gelatin | 7 grams |
| MOLLY McBUTTER cheese flavor | 3 grams |
| Water | 110 grams |
| McCORMICK Yellow Food Color | 20 drops |

In about 1 hour, the casted sheet was cut into round discs having a diameter of 3.75 cm. One disc was added into egg-white and fried in oil. It had the appearance of a runny "sunny side up" egg with a broken yolk. The impression of a witness who ate the egg without knowing that it was a simulated egg, was:

"My observation was of complete surprise: I did not know that this was an artificial product until after I had eaten it and it was explained to me that it was invented and not a natural egg".

Another egg yolk prepared as above, was added in egg-whites and placed in the freezer overnight. The following morning, the simulated egg was completely frozen. It was taken out of the freezer, and it was allowed to thaw at room temperature, and then it was fried. It gave equally good results as the previous one.

Two additional egg yolks were put together in the same container with egg-white corresponding to two "Jumbo" eggs, and placed in the refrigerator. Four days later, the double egg was removed from the refrigerator and fried. It was runny as the previous ones. The two yolks separated spontaneously from each other as the double egg was poured from the container to the fry pan. This demonstrates that more than one egg-yolk may be in the same package without any problems of one sticking to the other during storage and before consumption.

A similar sample of egg-yolk added in egg-white was placed in the freezer, and it was taken out 20 days later. It was placed in an egg-poacher in the frozen state in a way that the yolk was facing up. The yolk was at the bottom of the small container, where the egg was during the refrigeration period.

As the water in the poacher was boiling, the white of the artificial egg started melting, and the egg-yolk started moving downward.

Before it reached the bottom, however, a thick film of coagulated egg-white was formed at the bottom of the poacher-pan, and the artificial egg-yolk was trapped within the poached white.

Although the white was somewhat overcooked, and formed a bubbly appearance at the bottom with some non-uniformity in the inside, the egg-yolk remained with good flowable consistency, and the total looked and tasted like a real poached egg.

The above confirm the statements made in example 1 regarding the flavor of the yolk, and also demonstrate that a very realistic egg yolk may be made according to the present invention.

EXAMPLE 4

Two batches of egg-yolk were made with the following composition.

| 4-1 | |
|---|---|
| Non-fat dry milk powder | 10 grams |
| ARGO Corn Starch | 15 grams |
| MOLLY McBUTTER cheese flavor | 3 grams |
| The above were mixed together | |
| Water | 10 grams |
| It was added to the above and mixed to form a viscous, sticky paste | |
| Water | 3 grams |
| It was added to the above to form a pourable consistency | |
| Water | 9 grams |
| It was added to the above to form a very runny consistency | |
| Water | 88 grams |
| It was added and mixed very easily | |
| McCORMICK Yellow Food Color | 20 drops |
| It was mixed in | |
| KNOX gelatin | 7 grams |
| It was added slowly under vigorous stirring; it was not dissolved, but it was well dispersed | |

The above composition was heated as follows in each of the two batches:
  4-1A Until it became very viscous, almost non-pourable.
  4-1B Until it became viscous, but easily pourable.

4-1A was poured in a flat mold to form a sheet of about 3 to 5 mm thick, and put in the refrigerator. In about 1 hour, the gelled sheet was cut into doughnut rings having an inside diameter of 3.5 cm and an outside diameter of 5 cm. The rings, used as a peripheral portion of the yolk, were filled with composition 4-1B to act as the central portion of the yolk, and placed in the refrigerator. In one hour they were removed from the refrigerator, the were added in egg-white and put in the freezer.

4-1B was also poured in a flat mold to form a sheet of about 3 to 5 cm thick, and put in the refrigerator. In about 1 hour, the gelled sheet was cut into discs having a diameter of 5 cm, and the yolks were added to egg-white and placed in the freezer.

The following day, the eggs corresponding to both types of egg-yolks were taken out of the freezer, and allowed to thaw in the refrigerator. The were then fried separately.

The samples with the central and peripheral portions resulted in perfectly round yolks and they did not spread at all, while the yolk having a single composition, showed spreading, and ran during frying.

The above arrangement provides a good way of preventing the yolk from spreading during cooking.

EXAMPLE 5

Fifteen grams of ARGO corn starch were mixed with 110 grams of water, and heated until the viscosity increased considerably. The mixture was diluted with an additional 110 grams of water, and the heating was continued until the viscosity looked to have reached about the same high level. The mixture was again diluted with an additional 110 grams of water and heated again until the viscosity looked to have reached again the same level as before. It also looked that the rheology attained a more pseudoplastic character as the dilution increased.

This experiment, among other teachings, demonstrates that the amount of 15 grams of this particular starch does not give an equilibrium value, and therefore, the heating time is critical in achieving the desired flowability. Also, it leads to believe that the viscosity of the yolk will increase with time of cooking the egg. The pseudoplasticity of the resulting yolk, depending on the amount of this starch has to be taken into account in order to achieve the desired rheology.

EXAMPLE 6

The following were made:

| 6- | -1 | -2 |
|---|---|---|
| Non-fat dry milk powder (grams) | 10 | 10 |
| ARGO Corn Starch (grams) | 15 | 15 |
| KNOX gelatin (grams) | 7 | 7 |
| Water (cc) | 110 | 110 |
| McCORMICK Yellow Food Color (drops) | 20 | 20 |
| Vegetable oil (grams) | 50 | 10 |

The oil in both cases was added after the rest of the mixture had been heated and had started thickening. Both emulsions were poor. A way to get considerably better emulsions would have been to mix the oil with the milk powder and add it to a mixture of the rest ingredients under vigorous stirring, such as accomplished by a Waring Blender.

The mixtures were heated until adequately thickened, but they were still pourable easily. They were then casted into a sheet of approximately 6.5 mm thick, and put in the refrigerator overnight. The following day, exudation had occurred in both cases; more in case 6-1 than in case 6-2, as one would expect.

Egg-yolk discs, having a diameter of about 4 cm were cut out of the sheet, added in egg-white, and fried. Egg-yolk 6-2 was unexpectedly less viscous than 6-1 or other egg-yolks prepared in previous examples having similar compositions but containing no oil. The texture and mouthfeel were more sticky than the mouthfeel of yolks containing no oil, or real egg-yolks. The texture, which was more grainy might be attributed to the poor emulsification of the oil. It seems that the use of a Waring blender, as well as emulsifiers, such as Tween 20, 40, 60, 80, propylene glycol monolaureate, mono- and diglycerides, and the like, or mixtures thereof would have helped in the emulsification.

This example, among other teachings, demonstrates that fatty substances may be used, but they are not necessary in the composition.

EXAMPLE 7

The following were made:

| 7- | 1 | 2 |
| --- | --- | --- |
| Corn Starch (grams) | 5 | — |
| Non-fat milk (grams) | 10 | — |
| Knox Gelatin (grams) | 7 | 7 |
| Water (grams) | 110 | 110 |
| Food grade yellow color (drops) | 20 | 20 |

In case of composition 7-1, the mixture was heated at about 70° C. until it became viscous. It seemed that the viscosity was not increasing appreciably after about 20 minutes. It was then casted into a small pan on aluminum foil to a thickness of about 5 mm, and refrigerated.

It was very interesting that warm liquid composition 7-1, when poured into cold tap water, solidified immediately and remained as a separate undissolved phase, which could be handled. This observation provides a way of solidifying the artificial egg-yolks very fast. For example, the hot or warm yolks may be extruded on a cold belt which is dipped into chilled water. The solidified and still wet yolks may then be added into packaged egg-white for freezing.

In case of composition 7-2, the mixture was heated until the gelatin dissolved, and it was refrigerated in a similar manner as above.

When the two compositions were examined after approximately two hours, firm gels had been formed. The cast gels were cut in disks having a diameter of 4 cm. The discs of composition 7-1 were much stronger in handling than those of composition 7-2. In both cases the weight of each yolk varied from 6 to 7 grams.

In frying egg experiments at medium/high setting of the electric element, it was found that composition 7-2 gave too runny yolks from the beginning. In the case of composition 7-1, the yolks did not run during cooking, and they formed a membrane on their surface, which later seemed to have disappeared. However, they ran in all experiments (three) during trying to transfer them from the fry pan to a dish. This shows again the importance of the two-viscosity yolk of certain previous experiments, where there was a central portion and a peripheral portion, the peripheral portion being more viscous than the central one.

Mixed in the frying pan to make "scrambled" eggs with egg-white, they gave normal non-sticky consistency, and natural appearance, except that the yellow color was light. Other compositions had given in the past sticky consistency and very grainy appearance. However, the size of the previous yolks was larger, and this had a considerable influence.

The above example, among other teachings, demonstrates a way to make the eggs suitable for both cooking options. The size of the yolk is also important regarding the containment of the yolk at a certain place without running at least during cooking.

EXAMPLE 8

8-1

One egg-white was warmed to a temperature of about 35°–40° C. over a steam bath, and about 30 grams of equal quantities of compositions 1 and 2 of example 7 were added and stirred until they melted. The mixture was then poured onto an aluminum foil in a small pan and refrigerated.

8-2

Two egg-whites were warmed as above and 4 grams of Knox gelatin and 6 grams of non-fat dry-milk were added and stirred until the solids dissolved. The mixture was again poured on an aluminum foil in a small pan and refrigerated.

The following day the two compositions were taken out of the refrigerator. They had been gelled to somewhat softer gels than the ones received with compositions containing no egg-white in previous examples. The thickness of the gelled sheets was about 5 mm, and they were cut into disks having a diameter of about 4 cm.

A disk or yolk from each of the above compositions was added in an egg-white, and the mixture was fried at medium/high heat. The yolk of during 8-1 solidified fully after it first meltedduring cooking, while the yolk of 8-2 remained somewhat as a viscous liquid even after cooking. In similar experiments conducted at higher temperature frying, 8-2 showed also much more foaming and bubbling than 8-1. In all cases, running of the yolk was developed before solidification.

In additional experiments, where the egg-yolk was fried with the egg-white in the form of "scrambled eggs", at medium/high setting of the element, the solidification of the total mass was complete in both cases. The appearance of the egg containing 8-1 was more uniform than that of the egg containing 8-2.

This example, among other teachings, demonstrates that the use of negative non-reversible gel formers, such as egg-white, in the egg-yolk composition, may result in final solidification of the egg, upon cooking. It also demonstrates that the egg-yolk may be made composition-wise to pass through a low viscosity region before solidification, if so desired. Finally, it demonstrates that the egg-yolks of this embodiment are equally suitable for making scrambled eggs or omelette.

EXAMPLE 9

Using the following formula, different gums as shown below were mixed with water at room temperature in a Waring blender at low speed for 15 seconds, unless the viscosity became too high earlier to adversely affect the mixing action. All these gums came from HERCULES or AQUALON, a subsidiary of HERCULES. AQUALON's address is 2711 Centerville Rd., PO Box 15417, Wilmington, Del. 19850-5417.

| 9-A | |
|---|---|
| Water | 55 grams |
| Yellow food color | 20 drops |
| Gum | 4 grams |

9-1

Locust Bean Gum FL 50-50; became very viscous but still pourable gel.

It was heated, but the viscosity did not seem to change.

9-2

The same as above, but it was not heated.

9-3

GENU PECTIN, Type LM 12CG, Lot #G944516; very easily pourable; somewhat dirty yellow.

9-4

GENUVISCO CARRAGEENAN, Type J Lot #945802; it fast became a non-pouring gel.

9-5

GENU PECTIN Type BB Rapid set, LOT #923373; very easily pourable; dirty yellow.

9-6

GENU PECTIN Type DD Slow set, lot #936435; very easily pourable; dirty yellow.

9-7

GENUGEL CARRAGEENAN, Type CHP-2F, Lot #930640; gelled immediately into a very slowly pourable gel.

9-8

CMC Type 7LF, Lot#62475 (01/90); very easily pourable.

9-9

CMC Type 7MF, Lot #58449 (06/89); viscous but pourable.

9-10

CMC Type 7H4F, Lot#63360 (03/90); it immediately gelled, but it looked well dispersed; it looked more grainy than samples 1 and 2.

In decreasing firmness, the samples may be categorized as follows:
- 10, 1, 2, 4: Non pourable; small difference between them.
- 7: Very slowly pourable.
- 9: Slowly pourable.
- 3: Pourable
- 5: Pourable.
- 3: Pourable
- 8: Pourable
- 6: Very easily pourable.

All samples were put in the refrigerator overnight.

The following morning, the samples were examined again, and the same order of pourability was found to be true.

The following samples were heated in a hot water bath with the following results.

4: melted, and when cooled it looked like a softish gelatin gel.

7: melted, and when cooled it looked like an extremely firm gelatin gel. It could remelt, but only at significantly higher temperatures than room temperature.

9: some running, but no permanent effect.

10: no running.

3, 5, 6, and 8: They looked to become thinner at the higher temperatures, but no permanent effect.

The above results, among other teachings, show that most gums are more suitable to be used as viscosity builders, while others, such as the Carrageenan type, are more suitable as positive reversible gel formers. However, their gels melt at higher temperatures than those of gelatin, and therefore, it is preferable that they are used for yolks giving the appearance of more cooked (towards "over hard") eggs. Of course, the pectins, with appropriate cross-linkers, may also be used for "over hard" eggs.

EXAMPLE 10

Egg-yolks were made as in the case of Example 3-1, except that they contained no cheese flavor. All other quantities were as stated in the case of Example 3-1.

Two hours after the yolks were in the refrigerator, they were taken out.

10-1

No treatment; it was placed in egg white.

10-2

It was immersed in water, and then breaded with Locus bean powder; this was repeated three times; it was placed in egg-white.

10-3

Same treatment as in case 2, but I used CMC 7H4F in place of the Locus bean gum.

All three were fried in oil at medium/high setting. No 1 showed spreading and ran, while nos 2 and 3 remained contained in a round shape. The best looking was No 2, as its round edge became flash with the white. The ones breaded with the gums also formed a skin very similar to the one formed to real eggs that have been turned over in frying. Thus, more options become available by using this technique.

This process works also very well in combination with the one where the egg-yolk has two portions, the outside being more viscous than the inside.

The above, among other teachings, demonstrate a good way to make yolks, which during cooking remain well contained. One-time wetting and breading is adequate, as it will become apparent in following examples. As a matter of fact, the moisture present on the surface of the simulated yolk, without any additional wetting, is adequate for this purpose as demonstrated at later examples.

Other yolks were treated as follows:

10-4

No treatment; it was placed in egg-white, and then in the refrigerator.

10-5

It was coated with liquid vegetable oil; it was placed in egg-white, and then in the refrigerator.

10-6

It was coated with solid vegetable fat (CRISCO shortening); it was placed in egg-white, and then in the refrigerator.

In one day, the three refrigerated samples were examined for color leaching. Considerable leaching had occurred in cases 4 and 5, while almost no leaching at all occurred in case of sample 6. The comparison was made with a fresh egg-white, which had no yolk in it. The eggs were put back to the refrigerator.

In two days, the situation did not seem to change much. Sample No 6 still looked very good.

In three days, the refrigerated eggs were fried at medium heat separately from each other. Also, a fresh egg white was fried as a control.

The color of the egg whites in all cases was observed.

One could not distinguish easily any difference between the control and the white of No 6 even when compared side by side with each other.

The color of No 4 and No 5 was definitely yellowish, and comparable to each other. The yellowish color was visible not only when compared side by side with the control, but also when standing by themselves.

This shows without doubt that a solid-fat coating on the egg-yolk is very effective in preventing water-soluble colorants from leaching from the yolk to the white, or other aqueous liquids.

CRISCO shortening seems to be an excellent representative fat.

EXAMPLE 11

11-A

An egg-yolk mixture was made having the following composition:

| | |
|---|---|
| Corn Starch (grams) | 45 |
| Non-fat milk (grams) | 30 |
| KNOX Gelatin (grams) | 21 |
| Water (grams) | 330 |
| McCORMICK Yellow Food Color (drops) | 60 |

The mixture was heated until it had the consistency of a still liquid egg-yolk, and it was poured in a plastic rectangular container, the bottom of which was covered with aluminum foil.

The dimensions of the container were approximately 30 cm × 14 cm.

The container was then placed in the refrigerator for 24 hours. The gelled egg-yolk sheet was removed from the container and cut with a round cookie cutter into egg-yolks having a diameter of about 4 cm and a thickness of about 1 cm. Some egg yolks were cut with another cookie cutter having the shape of a heart.

Individual egg-yolks made this way were put in egg whites in small containers. Some were not subjected to any treatment, some were breaded with Locust Bean Gum, some were greased (coated) with CRISCO shortening (heated just enough to melt), and some were subjected to both treatments. The small containers were then placed in the freezer with the intent to stay frozen for a number of days, then thawed and evaluated.

The treatment of the egg-yolks was as follows:

| SAMPLE NO. | BREADING* | GREASING | YOLK SHAPE |
|---|---|---|---|
| 11-1 | — | — | — | round |
| 11-2 | — | — | — | round |
| 11-3 | 1 | 1 | — | round |
| 11-4 | 1 | 1 | — | round |
| 11-5 | — | — | 1 | round |
| 11-6 | — | — | 1 | round |
| 11-7 | 1 | 1 | 1 | round |
| 11-8 | 1 | 1 | 1 | round |
| 11-9 | 2 | 2 | — | round |
| 11-10 | 2 | — | round |
| 11-11 | 2 | 1 | round |
| 11-12 | 2 | 1 | round |
| 11-13 | 2 | 1 | round |
| 11-14 | 1 | 1 | round |
| 11-15 | 1 | 1 | heart |
| 11-16 | 1 | 1 | heart |

1 = Dipping once in water and then breading
2 = Dipping in water, breading, dipping in water, and breading again.

After 11 days, all eggs were taken out of the freezer, and put in the refrigerator.

After two days, Nos 13, 14, and 15 were taken out of the refrigerator and were fried one at a time at medium/high setting of the heater element. All had been defrosted during this period of time except for No 15, which still had a small skin of ice on top of the white.

Upon frying, No 1 looked like a sunny-side-up version with a broken egg-yolk. It did run to a certain degree during being transferred from the fry pan to the plate. The color had extremely small leaching into the white, which however could not be perceived easily by an unexperienced eye, especially not specifically looking for it.

No 13 looked like an over-easy version. It did not run at all; actually it probably stood up too much. No color leaching into the white was observed.

Nos 14 and 15 looked also like over-easy, and they had the best overall appearance and consistency, according to witness, and in the applicant's opinion. They did not run at all. The heart shape was definitely distinguishable with some deformation. All yolks looked somewhat swollen. No color leaching into the white was observed.

Four days later, the rest of the eggs were taken out of the refrigerator and were fried one at a time at medium/high setting of the heater element.

No 2 looked like a sunny-side-up version with a broken egg-yolk. The egg-yolk ran considerably during transferring the fried egg from the fry pan to the plate. The color had definite yellow leaching into the white.

Nos 3 and 4 looked like fried in an over-easy manner. They did not run at all. The color leaching was similar to that in case of egg No 2.

The egg-yolks of Nos 5 and 6 ran also like the one in case of egg No 2. Somewhat less color than that in the case of No 2 seemed to have leached into the white, but the difference was small.

Nos 7 and 8 behaved as No 3, with the difference that somewhat less color leached into the white.

Nos 9 and 10 behaved as No 3, with the difference that their egg-yolks developed thicker skins.

Nos 11 and 12 behaved as No 7, with the difference that their egg-yolks developed thicker skins.

No 16 behaved as No 7. The heart shape remained well distinguishable with some small deformations.

The above, among other teachings, example demonstrates useful aspects of gums and fats as coatings for the simulated yolks of the present invention. It also demonstrates that differently shaped egg-yolks may be made to retain their form, even during cooking.

EXAMPLE 12

The following methyl cellulose and hydroxypropyl-/methyl cellulose (METHOCEL) products were initially dispersed in boiling water. They were stirred while subjected to the effect of a cold water bath until their viscosity was high enough to ensure good suspension of the dispersed particles. They were then placed in the refrigerator to be fully hydrated.

| 12-    | -1  | -2  | -3  | -4  | -5  |
|--------|-----|-----|-----|-----|-----|
| Water  | 110 | 110 | 110 | 110 | 110 |
| A15LV  | 15  | —   | —   | —   | —   |
| A4C    | —   | 4   | —   | —   | —   |
| A4M    | —   | —   | 2   | —   | —   |
| K100LV | —   | —   | —   | 6   | —   |
| K4M    | —   | —   | —   | —   | 2   |

In separate experiments, one teaspoonful of each of 12-1, -2, and -3 were put in a small round soup-serving spoon, which was half-way immersed in slightly boiling water. Gelation occurred in all cases.

12-2, and -3 were diluted to different degrees down to 0.25 part of resin per 110 parts of water, and still showed some gelation. If the liquid in the round soup-serving spoon was stirred, syneresis (separation of the water from the solids, which coagulated) occurred. Sample 12-3 produced firmer gels than E87-2, but the syneresis phenomenon was more pronounced. A level of 0.5 to 1 part of resin per 110 parts of water seemed to be optimum in gelling properties needed as the applicant speculated for use in the egg-yolk formulation.

The gelling of 12-4 and -5 at a level of 0.5 parts of resin per 110 parts of water did not seem to the applicant to be firm enough for best results in the egg-yolk formulation.

In final analysis, the applicant would prefer to use 12-3 at a level of 0.5% to 0.8%, compared to the other solutions, which nevertheless are still useful for the same purpose. Depending on the type of Methocel, one may speculate that a useful range would be between 0.1% to 10%, with a preferable range of 0.5% to 2%. Especially useful would be the use of these negative reversible gel formers in combination with restrictive barriers, such as those shown in other examples. Also, they could be used for the peripheral portion of a two-portion yolk to render it less flowable than the central portion during cooking, for the yolk to retain its round shape and not spread.

EXAMPLE 13

The following were made by dispersing the Methocel powders in boiling water, cooling to about room temperature, and placing in the refrigerator.

| 13-           | A   | B         |
|---------------|-----|-----------|
| Methocel A4M  | 8   | — grams   |
| Methocel K4M  | —   | 8 grams   |
| Water         | 392 | 392 grams |

The following were made by initially mixing the corn starch and the milk powder together, adding the water slowly and stirring with a spoon, adding the color, dispersing the gelatin, heating until the viscosity was raised to resemble the viscosity of a still runny egg-yolk, cooling to around 30° C., and then adding and mixing the methocel solution which was also previously brought to about 30° C. The amounts of methocel solutions added were such as to provide 0.5% Methocel in the final product, based on total.

The amounts are given in grams, unless otherwise stated.

| 13-                        | 1    | 2    |       |
|----------------------------|------|------|-------|
| Non-fat milk powder        | 10   | 10   | grams |
| ARGO corn starch           | 15   | 15   | grams |
| Water                      | 74.5 | 74.5 | grams |
| KNOX Gelatin               | 7    | 7    | grams |
| 13-A                       | 35.5 | —    | grams |
| 13-B                       | —    | 35.5 | grams |
| McCORMICK Yellow Food Color | 20   | 20   | drops |

The compositions were casted into containers of approximately 10 cm × 15 cm, put in the refrigerator for about 2 hours, and cut into round discs having a diameter of about 4 cm.

They were then placed in egg-white in small containers which were put in the freezer.

The following day, the samples were taken out of the freezer and allowed to thaw at room temperature. They were then fried.

The egg-yolks of both samples melted, flattened to the level of the white, looked as temporarily thickened, and formed skin during the frying process. They did not break during handling or transferring.

No 1 retained the round shape during frying, but No 2 lost it to a degree.

This demonstrates very clearly that negative reversible gel formers, such as for example methyl and hydroxypropyl/methyl cellulose help in preventing spreading during cooking and running of the egg-yolks during transferring the eggs to the plate from the fry pan.

EXAMPLE 14

The following were made:

| 14-                    | 1   | 2   | 3   |       |
|------------------------|-----|-----|-----|-------|
| Maxi-Gel 7724 starch   | 15  | —   | —   | grams |
| Mira-Set B starch      | —   | 15  | —   | grams |
| Soft-Set starch        | —   | —   | 15  | grams |
| Water                  | 110 | 110 | 110 | grams |
| McCormick yellow food color | 20  | 20  | 20  | drops |

14-1 was made by adding water slowly into powder Maxi-gel 7724, which was dispersed easily, and then heating until the viscosity became similar to a still flowable egg-yolk. The composition was cast into a container approximately 10 cm × 15 cm, and put in the refrigerator.

14-2 was made by adding water slowly into powder Mira Set B, which showed dilatancy at low water levels, but it was dispersed easily, and then heating until no appreciable viscosity increase was observed. At this point the viscosity of this composition was considerably lower than that of composition 14-1. The composition was then cast into a similar container as above, and put in the refrigerator.

An attempt to disperse Soft-Set as described for the other samples was not successful, because of lump formation. Thus, a Waring blender containing the water was used, and the starch was added to the vigorously stirred water. Even then the dispersion was not complete. No heat step was followed. The sample was very viscous, but still flowable. The composition was then casted into a similar container as above, and was also put in the refrigerator.

The following day, the casted compositions were taken out of the refrigerator, and examined. 14-1 had a paste consistency. 14-2 and -3 had gelled into relatively weak gels, which however could be handled. 14-2 had formed a stronger gel than 14-3. Discs were cut from the gelled sheets of 14-2 and -3 having a diameter of about 4 cm.

Discs of 14-2 an -3, as well as a piece of paste of E90-1 were placed in egg-white in small containers for about ½ hour, and then fried.

14-1 had sticky mouthfeel, while the other two did not. All retained substantially round shape during frying. 14-2 and -3 had a gel-like structure during and after frying.

The above, among other teachings, demonstrate that certain starches, which are usually employed as viscosity builders according to the present invention, may also be used by themselves as thermoreversible positive gel formers to make the egg-yolk, even in the form of a paste, as long as they do not mix substantially with the liquid egg-white. Of course, use of more effective thermoreversible positive gel formers, such as gelatin to produce a firm gel, is preferable, especially in combination with viscosity builders, as also increasing the range of controllably obtainable viscosities.

EXAMPLE 15

The following 1% solution was made by using a Waring Blender:

| 15-A | |
|---|---|
| CMC 7H4F | 8 grams |
| Water | 792 grams |

The following were then made:

| 15- | 1 | 2 | |
|---|---|---|---|
| 15-A | 110 | — | grams |
| Mira-Set B | — | 7 | grams |
| Non-fat milk powder | 10 | 10 | grams |
| KNOX gelatin | 7 | 7 | grams |
| Water | — | 110 | grams |
| McCormick Yellow food color | 20 | 20 | drops |

The samples were heated to almost boiling to dissolve the ingredients. Composition 15-1 was casted into a container, approximately 10 cm × 15 cm, and put in the refrigerator. Composition 15-2 was poured into the disc-shaped cavities (having a diameter of about 4 cm) of a polyester mold made for chocolate casting. The samples were removed from the refrigerator in about 1 hour.

The gelled sheet of 15-1 was cut into discs having a diameter of about 4 cm, while the gelled discs of 15-2 were removed from the mold. The discs corresponding to 15-1 were softer than those corresponding to 15-2. Both, however, were strong gels. Egg-yolks from both cases were put in egg-whites and fried.

The egg-yolk of the egg corresponding to 15-1 did not loose the round shape during frying, and it did not break during transferring the egg to a plate from the fry pan. The egg-yolk did not have sticky mouthfeel. It looked like a sunny-side-up prepared egg.

The egg-yolk of the egg corresponding to 15-2 ran very much.

Another egg-yolk disc corresponding to case 15-2 was immersed in water and then breaded (dusted) with Locust Bean FL 50/50 powder. It was then placed in egg-white and fried. The egg-yolk did not loose its round shape. It formed an excellent white skin, and it looked exactly like a real over-easy egg. The viscosity remained very low on the inside. The egg-yolk did not break during transfer to a plate. It had a light pasty mouthfeel.

The above example, among other teachings, demonstrates the use of molds for casting the yolks as an alternative of casting in sheet form and then cutting the yolks in a disc form. It also demonstrates the use of gums and starches as viscosity builders, and it shows once more the usefulness of a restrictive barrier.

EXAMPLE 16

The following was made:

| 16-A | |
|---|---|
| Artificial Egg Flavor | 0.7 grams |
| Non-fat dry milk powder | 10.0 grams |
| The above were mixed well | |
| 15-A | 110.0 grams |
| The above was added slowly and mixed | |
| McCormick yellow food color | 20 drops |
| The above was added and mixed | |
| KNOX Gelatin | 7.0 grams |
| The above was added slowly while mixing | |

The total formulation was heated and stirred until the gelatin was completely dissolved. It was then casted into a container approximately 10 cm × 15 cm, and put in the refrigerator. The samples were removed from the refrigerator in about 2 hours, and the gelled sheet was cut into egg-yolk discs having a diameter of about 4 cm, which in turn were breaded with Locust Bean Gum FL 50-50 (Lot LE387).

16-1 and -2

Two egg-yolks, as prepared above, were put in egg-whites and fried in oil at medium/high heat. A real egg with a double egg-yolk was also fried under the same conditions as a control.

No running of the egg-yolks during transfer to a plate from the fry pan occurred. The experimental yolks were flatter in appearance than the real ones. The experimental one looked like a real one with skin and good color. The flavor was somewhat intense, but good. It seems that it needed about half the amount of what had been added. However, when tasting the real yolks versus the artificial ones back and forth, no distinction could be made in either mouthfeel, consistency, taste, or any other property.

16-3 to -6

Four experimental egg-yolks were put each in individual small containers along with egg-whites, and placed in the freezer.

16-7 and -8

Two experimental egg-yolks were wrapped individually in aluminum foil and put in the freezer.

The following day 95'-3 was taken out of the freezer and put in the microwave oven at 10% power for three minutes, and then for another three minutes, at which point it was completely defrosted. A yellowish halo had been formed around the yolk. When the egg was fried, a yellowish cast corresponding to the halo, remained around the yolk. This halo is believed to be due to light syneresis during the freeze/thaw process, and to colorant leaching from the egg-yolk, accompanied by entrapment of the colorant within a massive light-gel structure formed as the restrictive barrier of the locust bean gum tends to dissolve in the egg-white. The yolk did not break during cooking or transferring the egg from the fry pan to a plate.

16-4 was also taken out of the freezer and put in lukewarm water. It was defrosted in nine minutes. A similar yellowish halo had been formed around the yolk. When the egg was fried, it behaved as the one in the case of 16-3.

16-5 and -6 were allowed to defrost at room temperature. A less defined yellowish halo was present around the yolks. When the eggs were fried, they behaved as in the case of 16-3 with the difference that the yellowish halo was less defined and part of it moved to other regions of the white.

16-7 and -8 were allowed to defrost in the refrigerator. A thin yellowish gel-like exudate was observed on their surface. It seems that water containing yellow colorant exuded and dissolved the locust bean gum skin, and produced the gel-like structure.

The degree of syneresis could be judged by the amount of frost formed around yolk material after freezing, or from the free liquid produced during thawing of frozen yolk material, which of course had not been mixed with egg-white. In this respect, composition 16-A showed light syneresis.

In addition to other teachings, such as for example the ones regarding the behavior of the water soluble colorant, this example shows that a restrictive barrier, such as the locust bean gum, which is a hydrocolloid having gel limiting dissolution in the egg-white, is an excellent barrier for confining the yolk, due to its soft-gel structure being adhered to the yolk. In addition, when the egg is cooked, the white contained in this soft gel coagulates and forms an outstanding skin. This type of structure for the barrier is highly preferable as compared to a thin insoluble membrane, because it provides a less sensitive, self-healing configuration. Any ruptured regions are reconstructed by further dissolution of undissolved hydrocolloid.

EXAMPLE 17

| 17-A | |
|---|---|
| Water | 396 |
| KELDROL | 4 |

The water was put in a Waring blender, and the powdered gum was added slowly while the blender was on.

| 17-B | |
|---|---|
| Artificial Egg Flavor | 0.3 grams |
| Non-fat dry milk powder | 10 grams |
| The above were mixed well | |
| 17-A | 110 grams |
| the above was added slowly with thorough | |

| -continued | |
|---|---|
| 17-B | |
| McCormick Yellow Food color | 20 drops |
| Gelatin | 7 grams |

The gelatin was dispersed and the formulation was heated until uniform. It was then cast into a container approximately 10 cm × 15 cm, and put in the refrigerator. The samples were removed from the refrigerator in about 3 hours, and the gelled sheet was cut into egg-yolk discs having a diameter of about 4 cm, which in turn were breaded with Locust Bean Gum FL 50-50 (Lot LE387).

17-1 and -2

Two egg-yolks, as prepared above, were put in egg-whites and fried in oil at medium/high heat. The experimental yolks looked like real with skin and good color. The flavor and mouthfeel were excellent.

17-3 and -4

Two experimental egg-yolks were put each in individual small containers along with egg-whites, and placed in the freezer.

17-5 and -6

Two experimental egg-yolks were wrapped individually in aluminum foil and put in the freezer.

| 17-C | |
|---|---|
| Water | 200 grams |
| McCormick yellow food color | 20 drops |
| KELGUM | 4 grams |

The above were mixed in a Waring blender as in case 17-A, and the formulation was heated to about boiling for 3 minutes. It was then casted into a container approximately 10 cm × 15 cm, and put in the refrigerator. The samples were removed from the refrigerator in about 2 hours, and the gelled sheet was cut into egg-yolk discs having a diameter of about 4 cm, which in turn were breaded with Locust Bean Gum FL 50-50 (Lot LE387).

Samples similar to 17-1 to -6 were made and treated in a similar manner.

All samples made were evaluated in a similar manner as the samples of Example 16.

The results showed somewhat more syneresis in case of the case of composition 17-B than in the case of 16-A composition. Considerably higher syneresis was observed in the case of 17-C composition. In addition, the yolks of the samples of 17-C formulation, when fried, had a somewhat gel-like structure.

EXAMPLE 18

| 18-A | |
|---|---|
| DREWMULSE 8731-S | 1.0 gram |
| Carotenal Solution #73 | 2.0 grams |
| The above were mixed well | |

| 18-B | |
|---|---|
| Non-fat dry milk powder | 10 grams |
| 18-A | 35 drops |

| 18-B | |
|---|---|
| The above were mixed well and the following were added slowly and mixed thoroughly, one at a time. | |
| Water | 100 grams |
| KNOX gelatin | 7 grams |

18-B was casted into a container approximately, 10 cm×15 cm, and put in the refrigerator. The sample was removed from the refrigerator in about 1 hour, and the gelled sheet was cut into egg-yolk discs having a diameter of about 4 cm, which in turn were breaded with Locust Bean Gum FL 50-50 (Lot LE387).

18-1 and -2

Two experimental egg-yolks were put each in individual small containers along with egg-whites, and placed in the freezer.

18-3 to -7

Experimental egg-yolks were put each in individual small containers along with egg-whites, and placed in the refrigerator.

Comments

The color of all these egg-yolks was too red. However, it served its purpose as an oil soluble colorant.

When milk is used, the additional emulsifier is not necessary. Mixing of the dye solution into the powdered milk is adequate to give good emulsion.

The following day, samples 18-1 and -2 were taken out of the freezer, and they were defrosted in warm (40°–45° C.) for about 15 minutes. They were then fried. Although there was some syneresis, no color leaching was observed. In both cases the skin was good, although somewhat loosened, and the egg-yolk did not break when transferring the fried egg from the fry pan to a dish. After frying, the egg-yolk of one of the two eggs was examined periodically by poking with a fork. It did not start gelling but after about 40 minutes.

Sample 18-3 was taken out of the refrigerator, examined and fried:

No color leaching at all.

The egg-yolk did not break, and it had excellent skin.

The rest of the samples were taken out of the refrigerator, one after one more additional day, one after three more additional days, an one after one more additional day. They were examined, fried and re-examined. The same results as in case 18-3 were received in every individual case.

The above example, among other teachings, demonstrates that no colorant leaching occurs with emulsified oil soluble colorants, probably because of the low diffusion rate of the oil droplets as compared to the intimately dissolved water soluble colorant.

EXAMPLE 19

| 19-A | |
|---|---|
| Water | 110 grams |
| McCormick yellow food color | 20 drops |
| The above were mixed and the following was added slowly under stirring | |
| KNOX Gelatin | 42 grams |
| The above was added slowly with vigorous mixing, and heated until the gelatin dissolved. | |

19-A was casted into a container approximately 10 cm×15 cm, and put in the refrigerator. The sample was removed from the refrigerator in about 1 hour, and the gelled sheet, which was extremely firm, was cut into egg-yolk discs having a diameter of about 4 cm, which in turn were breaded with Locust Bean Gum FL 50-50 (Lot LE387).

19-1

An egg-yolk, as prepared above, was put in egg-white and fried in oil at medium/high heat. The experimental yolk looked like real with skin and good color. The yolk did not break during transfer from the fry pan to a dish. The mouthfeel was rather sticky. It remained flowable for about 7 minutes on the dish and then gelled.

19-2

One experimental egg-yolk was put in a small container along with egg-white, and placed in the freezer.

19-3 to -7

Experimental egg-yolks were wrapped individually in aluminum foil and put in the freezer.

The following day, an attempt was made to defrost sample 19-2 in a microwave oven at 10% power and 6 minutes, but a large portion of the egg-white solidified and the egg-yolk started melting. Thus, the results of its behavior were inconclusive.

Sample 19-3 was taken out of the freezer and it was allowed to defrost at room temperature. It showed some syneresis (soft gel around the surface, probably due to exudation of liquid which dissolved the locust bean gum).

19-4A

Sample 19-4 was taken out of the freezer, placed in a small container with egg-white and put in the refrigerator. It was taken out of the refrigerator in about 6 hours and fried. The skin of the yolk was loose and broken. The egg-yolk ran during transfer of the egg from the pan to a dish. No color leaching was observed. The egg-yolk had a sticky mouthfeel from the beginning and started gelling in about 15 minutes.

19-5A

Sample 19-5 was taken out of the freezer, placed in a small container with egg-white and put back in the freezer. It was taken out of the freezer in about 6 hours, defrosted in warm water for 20 minutes (the water was 45° C. at the beginning and 32° C. at the end of the 20 minutes), and fried. The skin of the yolk was loose and broken. No color leaching was observed. The egg-yolk did not run during transfer of the egg from the pan to a dish.

19-6A and -7A

Samples 19-6 and -7 were taken out of the freezer, rinsed with water, breaded with locust bean gum (FL 50-50), placed each in a small container with egg-white and put back in the freezer. They were taken out of the freezer in about 6 hours, defrosted in warm water for 20 minutes (the water was 45° C. at the beginning and 32° C. at the end of the 20 minutes), and fried. The skin of the yolk in both cases was good and complete. No color leaching was observed. The egg-yolks did not run during transfer of the egg from the pan to a dish.

The above example, among other teachings, demonstrates that it is preferable to have the egg-yolk with the egg-white during the freeze/thaw process, or bread the yolk after it has been frozen. It also demonstrates that excessive amounts of thermoreversible positive gel former, such as gelatine, may provide sticky mouthfeel.

EXAMPLE 20

The following samples were made by mixing the ingredients and then warming in a hot water bath until complete dissolution of the gelatin.

| 20- | 1 | 2 | 3 | 4 | 5 | 6 | 7 | 8 |
|---|---|---|---|---|---|---|---|---|
| Water (grams) | 25 | 15 | — | — | — | — | — | — |
| 15-A (grams) | — | — | 32 | 46 | 48 | 49 | 49.5 | 49.5 |
| KNOX gelatin (grams) | 25 | 35 | 8 | 4 | 2 | 1 | 0.5 | 0.25 |
| Yellow color (drops) | 20 | 20 | 20 | 20 | 20 | 20 | 20 | 20 |
| % gelatin | 50 | 30 | 20 | 8 | 4 | 2 | 1 | 0.5 |

Each one of the compositions 20-1 to -8 were poured in two cavities of muffin pans, which in turn were put in the refrigerator. In two hours, the samples had been gelled to different degrees of firmness. The firmness of samples -1 to -4 was such as to render them easily removable from the pans and easily handlable. Sample -5 was difficult to remove without destroying, while sample -6 could not be removed without breaking. Sample -7 was semi-liquid, while sample -8 was liquid. The consistency of the compositions did not change much even after 8 hours in the refrigerator. Judging from the consistency of the above compositions, preferable levels of KNOX gelatin are between 1% and 50%, more preferable between 2% and 30% and even more preferable between 4% and 20%. I think that an even more preferable range would be 6% to 12%. The above apply for gelatins having the bloom characteristics of KNOX gelatin, when gelatin alone is used as the gelling material. Higher or lower concentrations will be required for gelatins having lower or higher bloom values respectively, according to rules well established in the art of replacing gelatins to form gels of desired firmness.

Two egg-yolks A and B, having a disc shape and a diameter of 4 cm were cut from most of the compositions, and their weight was measured as shown below. The egg-yolks were then placed in the freezer.

| 20- | 1 | 2 | 3 | 4 | 5 | 6 | 7 | 8 |
|---|---|---|---|---|---|---|---|---|
| Weight of yolk A | 6.4 | 9.4 | 10.2 | 12.4 | 10.3 | — | — | — |
| Weight of yolk B | 7.0 | 9.3 | 8.5 | 11.7 | — | — | — | — |

The following day, all egg-yolks were taken out of the freezer, rinsed in water until defrosted, squeezed between pieces of paper to remove any free water, and weighed. The egg-yolk corresponding to E103-5 was destroyed during this process and its weight was not taken. The new weight was as follows:

| 20- | 1 | 2 | 3 | 4 | 5 | 6 | 7 | 8 |
|---|---|---|---|---|---|---|---|---|
| Weight of yolk A | 5.6 | 8.3 | 8.8 | 10.0 | — | — | — | — |
| Weight of yolk B | 6.6 | 7.9 | 6.8 | 8.9 | — | — | — | — |
| Mean % weight loss | 12 | 13 | 17 | 22 | — | — | — | — |

The above indicate that as the amount of gelatin increases the syneresis in the freeze/thaw process decreases. As found before, at the same time the mouthfeel becomes stickier and the time of the yolk to re-gel after it has been cooked and served decreases. Thus, one has to decide what is mostly desired in an individual situation and select the appropriate content of gelatin or other material of similar properties.

Samples 20-6, -7, and -8, still in the cavities of the muffin pan and in the refrigerator were reexamined. 20-8 was still liquid, 20-7 had become a thin paste, and 20-6 had become a soft gel. It was possible now to cut a disc having a diameter of about 4 cm and bread it with Locust Bean Gum powder. This was added into egg-white and fried. The egg-yolk formed a thick continuous skin, and did not break during transferring the fried egg from the fry pan to a dish. A teaspoonful of 20-7 was also disposed on Locust Bean Powder for breading, then added into egg-white and fried. The egg-yolk formed a non-uniform but continuous skin, and surprisingly did not break during transferring the fried egg from the fry pan to a dish. This shows that even pastes, especially after appropriate breading may very well be used as egg-yolks, with difficulty however.

An additional day later, each of the egg-yolks labelled 20-1A, -2A, -3A, and -4A were breaded with Locust Bean Gum (FL 50-50), added in egg-white, and fried individually. None of them broke during transferring the respective eggs from the fry pan to a dish. They were tested periodically by poking them with a fork to determine the time it took for the egg-yolks to start gelling and becoming stringy. The results are as follows:

20-1A, 1 min; 20-2A, 10 mins; 20-3A, 20 mins; and 20-4A, 95 mins.

This example, among other teachings, demonstrates a determination of preferable levels of gelatin to be used as a positive thermoreversible gel former. Of course gelatins of different Bloom values would change these ranges accordingly (lower Bloom values would raise the values of the ranges and higher Bloom values would lower the values of the ranges).

EXAMPLE 21

The following was made by mixing first all the dry ingredients, adding the water and the liquid food color at once, stirring to disperse, and heating to dissolve the gelatin and hydrate the starch, until no more thickening occurred.

| 21-A | |
|---|---|
| Natural Flavor compound (taste of egg) | 0.1 gram |
| FREEZIST M Starch | 8.0 grams |
| Non fat milk powder | 10.0 grams |
| KNOX gelatin | 7.0 grams |
| Water | 110 grams |
| McCormick yellow food color | 20 drops |

21-A was cast into a container approximately 10 cm × 15 cm, and put in the refrigerator. The sample was removed from the refrigerator in about 2 hours, and the gelled sheet was cut into egg-yolk discs having a diameter of about 4 cm, which in turn were breaded with Locust Bean Gum FL 50-50 (Lot LE387).

21-1 and -2

Two egg-yolks, as prepared above, were put in egg-whites and fried in oil at medium/high heat. The egg-yolks did not break during transferring to a dish from the fry pan. They had a skin, but they looked somewhat thin (low viscosity). They needed more flavor. The mouthfeel was excellent.

21-3

An egg-yolk was wrapped with aluminum foil and put in the freezer. It was examined two hours later to observe frozen water on its surface from syneresis. It had only very little accumulation.

EXAMPLE 22

The following were made by mixing first all the dry ingredients, adding the water and the liquid food color at once, stirring to disperse, and heating to dissolve the gelatin and hydrate the starch, until no more thickening occurred.

| 22- | 1 | 2 | 3 | |
| --- | --- | --- | --- | --- |
| Natural Flavor compound (egg) | 0.2 | 0.2 | 0.4 | grams |
| FREEZIST M Starch | 10 | 13 | 26 | grams |
| Non fat milk powder | 10 | 10 | 20 | grams |
| KNOX gelatin | 7 | 7 | 14 | grams |
| Water | 110 | 110 | 220 | grams |
| McCormick yellow food color | 20 | 20 | 20 | drops |

22-1 and -2 were cast into containers with dimensions approximately 10 cm × 15 cm, and put in the refrigerator. The samples were removed from the refrigerator in about 3 hours, and the gelled sheets were cut into egg-yolk discs having a diameter of about 4 cm (weight about 8 grams per yolk), which in turn were breaded with Locust Bean Gum FL 50-50 (Lot LE387).

22-3 (same composition as 22-2, except that the quantity was double) was cast into a container approximately 15 cm × 15 cm, and put in the refrigerator. The sample was removed from the refrigerator in about 4 hours, and the gelled sheet was cut into egg-yolk discs having a diameter of about 4 cm (weight of about 12 grams per yolk), which in turn were breaded with Locust Bean Gum FL 50-50 (Lot LE387). They took about 0.2 g. of gum per yolk.

Egg-yolks, as prepared above, were put in egg-whites and fried in oil at medium/high heat. None of the egg-yolks broke during transferring to a dish from the fry pan. They had a good skin. In the case of 22-1 they still looked somewhat thin (low viscosity). They looked excellent in the cases of 22-2 and -3. The taste and mouthfeel in all cases was excellent.

22-3A, -3B, 3C

The following day, egg-yolks of composition 22-3 were added in egg-white and placed in the refrigerator.

22-3D, -3E, -3F

Egg-yolks of composition E106-3 were added in egg-white and placed in the freezer. 22-3i What remained after cutting egg yolks of compositions 22-2 and -3 were mixed together, were remelted over a boiling water bath, and re-casted to a sheet of about 1 cm thick.

After one more additional day, samples 22-3A, -3B, and -3C were fried. Only a small amount of color leaching had taken place, which was not objectional. None of the egg-yolks broke during transferring to a dish from the fry pan. They had excellent skin, appearance, taste and mouthfeel.

Samples 22-3D, -3E, and -3F were taken out of the freezer. One was defrosted in warm water for 20 minutes, one at room temperature, and one in the refrigerator. They all showed outstanding characteristics upon frying without perceptible color leaching.

The weight of the egg-yolk of a real "extra large" egg was found to be about 17 grams, while the weight of the egg-yolk corresponding to a "medium" egg was found to be 10 grams.

EXAMPLE 23

The following was made by mixing first all the dry ingredients, and adding them to the water slowly under stirring. The water already contained the liquid food color. The dispersion was then heated under stirring to dissolve the gelatin and hydrate the starch, until no more thickening occurred.

| 23-A | | |
| --- | --- | --- |
| Natural Flavor compound | .04 | grams |
| FREEZIST M Starch | 26 | grams |
| Non fat milk powder | 20 | grams |
| KNOX gelatin | 14 | grams |
| Water | 220 | grams |
| McCormick yellow food color | 40 | drops |

The composition was cooled to about room temperature and put in a small manual cookie extruder, which was set to deliver about 12 grams of material at a time. The orifice of the extruder had a round opening of about 15 mm.

Four round portions were delivered on an aluminum panel, which had been in the freezer to be kept cold. A second panel taken again from the freezer was pressed on top of the delivered portions against the first panel. A shim kept the two panels approximately 10 mm apart from each other. The assembly of the two panels was placed in the freezer for 3 minutes and then it was taken out. The panels were separated and the solidified yolks in the form of discs were breaded with Locust Bean Gum. They were then put individually in 4 small containers along with egg-whites, and placed in the freezer.

The following day, the 4 containers were taken out of the freezer. Two of them were defrosted in warm water in 20 minutes, and two at room temperature. They were then fried in oil at medium/high heat. None of the egg-yolks broke during transferring to a dish from the fry pan. They looked excellent in all cases. The skin, taste and mouthfeel in all cases was excellent.

This example demonstrates a method comprising an extrusion step in the formation of the yolk. In a continuous production, the panels used in this example may be replaced by continuous belts.

EXAMPLE 24

| 24-A | | |
| --- | --- | --- |
| Turmeric concentrate 09744 | 20 | drops |
| Corn oil | 3.5 | grams |

24-B

The above amount of 24-A was added into 10 grams of non-fat dry milk powder and mixed well. This mixture was then added in 110 grams of water in a Waring blender and mixed for a few seconds.

13 grams of FREEZIST M Starch and 7 grams of KNOX gelatin were added under stirring. The dispersion was then heated under stirring to dissolve the gelatin and hydrate the starch, until no more thickening occurred. The color was bright yellow. The McCormick colorant, having been used in most of the experiments so far, has a considerably redder tint than this one, which means that other oil soluble colors, such as for example carotenes, ammatto, and the like, may replace part of the turmeric in order to achieve the same tint, if desired. The turmeric yellow color, however, does not seem to be objectionable, even without any further changes. Composition 24-B was casted into a container approximately 10 cm×15 cm, and put in the refrigerator. The sample was removed from the refrigerator in about 2 hours, and the gelled sheet was cut into egg-yolk discs having a diameter of about 4 cm.

24-1, -2

Two of the yolks as made above were breaded with Locust Bean Gum FL 50-50 (Lot LE387), added in egg-white, and put in the freezer.

24-3 to -6

Four of the yolks as made above were breaded with Locust Bean Gum FL 50-50 (Lot LE387), added in egg-white, and put in the refrigerator.

24-1C, -2C

Two yolks were cut from sheet 22-3i, were breaded with Locust Bean Gum FL 50-50 (Lot LE387), added in egg-white, and put in the freezer, as controls.

24-3C to -6C

Four yolks were cut from sheet 22-3i, were breaded with Locust Bean Gum FL 50-50 (Lot LE387), added in egg-white, and put in the refrigerator, as controls.

24-R

The remainders of the sheet produced as described in 24-B were also put in a container, and then in the refrigerator.

The following day, samples 24-3 and -3C were inspected. No color leaching could be observed in the case of 22-3, but some color leaching could be detected in case 24-3C. The color of the yolk in the case of 22-3 had turned somewhat redder all the way around. At the edges, the change was excessive with intense red/brownish color.

Sample 24-R remained intact without any color change. This means that the color change observed above was due either to the egg-white or to the Locust Bean Gum interacting with the components of the turmeric concentrate. To resolve this, the following was made.

24-7

One yolks from 24-R was added in egg-white (no breading) and put in the refrigerator.

One additional day later, samples 24-3 and -3C were taken out of the refrigerator and inspected again. No color leaching at all could be observed in the case of 22-3, but definite color leaching could be detected in case 24-3C. The color of the yolk in the case of 22-3 seem to have changed to darker brownish as compared to the initial change. Sample 109-7 did not develop any leaching, but the color of the yolk turned somewhat redder all the way around, in the same manner as in case 22-3. At the edges, the change was excessive with intense red/brownish color. This indicates interaction between the egg-yolk colorant and the egg-white.

24-X

A small amount of turmeric concentrate (No. 09744) was mixed with about three times as much oil. The solution was added then in about four times as much water and the total was shook for a few seconds. When this was allowed to separate into two phases, considerable amount of yellow had been transferred to the water phase. A few drops of the same turmeric concentrate was added to about 50 cc of water. It dissolved instantaneously, and gave a bright yellow color. These experiments demonstrate that despite the partial solubility of the turmeric colorant in water, no leaching occurs. Thus, oil-soluble colorants are preferable.

Samples 24-1 and -1C were removed from the freezer, they were defrosted in warm water for ½ hour, and they were fried along with the three eggs mentioned above, 24-3, -3C, and -7. Samples 24-1, -1C, -3, and -7 showed no color leaching in the fried white. Samples 24-3 and -7 had developed brownish yolks, while the rest of them had the original color. All samples, except 24-7 had very good skins. The skin of 24-7 was very thin. Sample 24-3C had very thin (low viscosity) egg-yolk, unexpectedly. The reason may have been that the egg-yolk had already stayed in the refrigerator for a few days before it was combined with the egg-white, and by the end of the experiment, it might have started deteriorating, and loosing viscosity. The egg-yolks of both 24-3C and 24-7 broke upon transferring the fried eggs from the fry pan to a dish. The rest of the yolks remained intact.

24-W1 to -W4

Egg-yolks made as described in 24-B were added to egg-whites, the pH of which was modified with 0, 2, 10, and 20 drops of lemon juice per medium egg-white, and was found to be approximately 9+, 8+, 8−, 7+, respectively (14-839 Alkacid ® Test Paper from Fisher Scientific Co.). The yolk of 24-W1 (no addition of lemon juice) started developing brownish color, especially at the edges in about 10 minutes.

24-Y1 and -Y2

Egg-yolks made as described in 24-B were added to a small cup containing water with some baking soda dissolved in it, and to a second small cup containing water, in which 10 drops of lemon juice had been added.

24-Z1 and -Z2

Egg-yolks made as described in 24-B and 22-3i were added to two separate cups containing plain water. Within a period of 5 to 10 minutes, yellow color had started leaching in the case of 24-Z2 (sample containing 22-3i) only.

One additional day later, samples 24-W1 to -W4 were examined and their yolks were found to have developed brown color in decreasing order, as the acidity increased from 24-W1 to W4. The differences were considerable, and perceptible in every step. Sample 24-W1 was brown, while 24-W4 had maintained substantially the original color. The yolk of sample 24-Y1 became brown, while sample 24-Y2 retained its original yellow color. The yolk of 24-Z1 showed no leaching, while the yolk of 24-Z2 showed considerable leaching.

This example, among other teachings, demonstrates the use of Turmeric oil soluble colorant, which does not exudate from the egg-yolk, as well as the necessary adjustments to avoid unacceptable color changes.

EXAMPLE 25

The following was made by mixing first all the dry ingredients, and adding them to the water slowly under stirring. The water already contained the liquid food color. The dispersion was then heated under stirring to dissolve the gelatin and hydrate the starch, until no more thickening occurred.

| 25-A | |
|---|---|
| FREEZIST M Starch | 13 grams |
| Non fat milk powder | 10 grams |
| Gelatin E4S | 7 grams |
| Water | 110 grams |
| McCormick yellow food color | 20 drops |

25-A was cast into a container approximately 10 cm × 15 cm, and put in the refrigerator. The sample was removed from the refrigerator in about 4 hours, and the gelled sheet, which looked very much like similar sheets made with KNOX gelatin, was cut into egg-yolk discs having a diameter of about 4 cm.

25-1

One of the egg-yolks made above was breaded with Locust Bean Gum FL 50-50 (Lot LE387), added to egg-white and fried. It looked similar to the ones made before with KNOX gelatin, but somewhat firmer in rounding during cooking. It had very good skin, and it did not break during frying or during the transfer of the egg from the fry pan to a dish. The mouthfeel was excellent.

This example, among other teachings, demonstrates the use of an industrial food-grade gelatin, as compared to KNOX gelatin.

EXAMPLE 26

The following were made by mixing first all the dry ingredients, and adding them to the water slowly under stirring. The water already contained the liquid food color. Each dispersion was then heated under stirring to dissolve the gum and hydrate the starch, until no more thickening occurred.

| 26- | A | B | |
|---|---|---|---|
| FREEZIST M Starch | 13 | 13 | grams |
| Non fat milk powder | 10 | 10 | grams |
| VARIGEL | 2 | — | grams |
| Stabilizer #931 | — | 5 | grams |
| Water | 110 | 110 | grams |
| McCormick yellow food color | 20 | 20 | drops |

26-A was casted into a container approximately 10 cm × 15 cm, and put in the refrigerator. The sample was removed from the refrigerator in about 5 hours, and the gelled sheet, which was easy to handle and looked like sheets made with gelatin, was cut into egg-yolk discs having a diameter of about 4 cm.

26-A1

One of the egg-yolks made above was breaded with Locust Bean Gum FL 50-50 (Lot LE387), added to egg-white and fried. It showed some resistance in rounding off during frying. It looked like an "over hard" fried egg; it could even be turned around without the yolk breaking or running. The skin was very good. The mouthfeel was also excellent.

26-A2 and -A3

Two of the egg-yolks made above were breaded with Locust Bean Gum FL 50-50 (Lot LE387), added to egg-white and put in the freezer.

E113-B was cast into a container approximately 10 cm × 15 cm, and put in the refrigerator. The sample was removed from the refrigerator in about 5 hours, and the gelled sheet, which was difficult to handle as being very delicate, soft, and weak, but still handlable, was cut into egg-yolk discs having a diameter of about 4 cm.

26-B1

One of the egg-yolks made above was breaded with Locust Bean Gum FL 50-50 (Lot LE387), added to egg-white and fried. It showed less resistance in rounding off during frying as compared to 26-A1. It looked also like an "over hard" fried egg, but somewhat softer. The skin was very good. The mouthfeel was also good but stickier than that of 26-A1.

26-A2 and -A3

Two of the egg-yolks made above were breaded with Locust Bean Gum FL 50-50 (Lot LE387), added to egg-white and put in the freezer.

All frozen eggs were taken out of the freezer. 26-A2 and -B2 were allowed to thaw at room temperature, while 26-A3 and -B3 were thawed in warm water in ½ hour. They were then fried.

No apparent syneresis, and no yellow color leaching had occurred.

All egg-yolks showed some resistance in rounding off. All eggs could be turned in the pan without sticking or running, and of course they were transferred to a dish from the pan, also without running. They looked like the yolk of an "over hard" egg with very slight flowability; the mouthfeel was also similar to that of such an egg in all cases. None of them felt sticky in the mouth, and they behaved very realistically.

The above experiment, among other teachings, is exemplifying very well the making of artificial yolks and eggs resulting upon cooking in "over hard" eggs.

EXAMPLE 27

A composition identical to 25-A but in a quantity of 3 times larger was cast into a container approximately 15 cm × 30 cm, and put in the refrigerator for about 4 hours. It was then cut into egg-yolks having a diameter of about 4 cm. The egg-yolks were in turn breaded with the powders listed below, one at a time, added into egg-whites, and fried five minutes after the addition. The behavior of the egg-yolk during frying, transferring the egg to a dish, and poking with a fork, was observed.

| | |
|---|---|
| 27-1 | Locust Bean Gum. FL 50-50 |
| 27-2 | GENUGEL CARRAGEENAN, Type CHP-2F, Lot # 930640 |
| 27-3 | GENUVISCO CARRAGEENAN, Type J Lot # 945802 |
| 27-4 | GENU PECTIN Type BB Rapid set, LOT # 923373 |
| 27-5 | FREEZIST M Starch |
| 27-6 | ARGO Corn Starch |
| 27-7 | CMC Type 7LF, Lot # 62475 (01/90) |
| 27-8 | CMC Type 7MF, Lot # 58449 (06/89) |
| 27-9 | CMC Type 7H4F, Lot # 63360 (03/90) |
| 27-10 | Methocel A4M |
| 27-11 | Methocel K4M |
| 27-12 | Maxi-Gel 7724 starch |

-continued

| 27-13 | KELTROL (Xanthan gum) |
| 27-14 | KELGUM |
| 27-15 | VARIGEL |
| 27-16 | CONTROL (no treatment) |

27-16 was the only one, the yolk of which showed some deformation in the fry pan, and ran during transferring the egg to a dish. 115'-6 formed a transparent skin, which effectively prevented the yolk from running or deforming during cooking. However, it was very weak, judging from poking the yolk with a fork later. In this respect, if very careful handling had not been administered during the transfer, the egg-yolk would have broken.

All the rest formed adequately strong and thick skins to ensure that the egg-yolk would not break during transfer, and of course during cooking. 27-4 formed a particularly strong skin. All these yolks except 27-5 and -12 developed white color of the skin. 27-5 and -12 had also very strong skins, which were at the same time transparent. All three starches 27-5, -6, and -12 gave transparent skins, due probably to gelatination. Thus, by using the above data and selecting the appropriate breading powder, one can make eggs, which when fried will look as "over easy", or as "sunny side up", and they will still have the advantages of a very well confined or encapsulated egg-yolk.

The fact that the egg-yolks of this example were more viscous than in other cases helped in preventing spreading and running.

Further evaluation of less viscous yolks, which also underwent a freeze/thaw cycle is shown in example 29.

EXAMPLE 28

The following was made by mixing well the powdered flavor with the starch, adding the water at once and stirring vigorously, and then adding the milk and the gelatin in turn slowly under stirring. Finally, the liquid food color was added. This procedure seems to work better than previous ones, at least for small batches as this one. The dispersion was then heated under stirring to dissolve the gelatin and hydrate the starch, until no more thickening occurred.

| 28-A | |
| --- | --- |
| Natural Flavor compound | 0.4 grams |
| FREEZIST M Starch | 26 grams |
| Non fat milk powder | 20 grams |
| Gelatin E4S | 14 grams |
| Water | 220 grams |
| McCormick yellow food color | 40 drops |

28-A was casted into a container approximately 15 cm × 15 cm, and put in the refrigerator. The sample was removed from the refrigerator in about 2.5 hours, and the strong gelled sheet, was cut into egg-yolk discs having a diameter of about 4 cm. The thickness of these yolks was higher than that used in a number of other cases.

28-1i

One of the egg-yolks made above was breaded with Locust Bean Gum FL 50-50 (Lot LE387), added to egg-white and fried. It had very good white skin, and it did not break during frying or during the transfer of the egg from the fry pan to a dish. The mouthfeel and taste were excellent.

28-2i

One of the egg-yolks made above was breaded with FREEZIST M, added to egg-white and fried. It had very good transparent skin, and it did not break during frying or during the transfer of the egg from the fry pan to a dish. The mouthfeel and taste were excellent.

28-3i

One of the egg-yolks made above was breaded with E4S Gelatin, added to egg-white and fried. It had what looked good and transparent skin, which did not break during frying or during the transfer of the egg from the fry pan to a dish. The mouthfeel and taste were excellent.

In all cases, the egg-yolks showed more resistance to round off than the respective yolks made in previous experiments with KNOX gelatin. This indicates that if one would desire to get exactly the same result as before, one would start by reducing the amount of starch in the formulation, since the starch is the main contributor of the viscosity at temperatures above the melting point of the gel, at least in this composition.

Three sets of three egg-yolks each were breaded with the above powders, and labelled 28-1ii, -2ii, and -3ii, respectively (nine eggs altogether). They were put in the freezer.

Fifteen days later, the three sets of eggs were taken out of the freezer. One set was thawed in warm water for ½ hour, and the eggs were fried. The results are as follows:

- 28-1ii—Very good strong whitish skin. The yolk did not spread during cooking or run during transfer.
- 28-2ii—Some melting and running was observed in the container. The skin was very weak and it broke during frying, allowing spreading of the yolk. Of course, there was running of the yolk during transferring to a plate from the fry pan.
- 28-3ii—Similar as in case E116-2ii. In addition, the skin was almost non-existent, and there was more spreading and running.

The remaining two sets were allowed to thaw at room temperature for about 4 hours, and the were fried. The result were very similar with the difference that no melting had occurred in any containers. Samples 28-3ii had developed a large yellowish halo in the container, while samples 28-2ii left some residue in the container when transferred to the fry pan. The halo seems to be due to exudation of colorant.

EXAMPLE 29

The following was made by mixing well the powdered flavor with the starch, and then adding it to the water under vigorous stirring, followed by the addition of the milk and the gelatin in turn slowly also under vigorous stirring. Finally, the liquid food color was added. This procedure seems to work even better than the one used in case of Example 28. The dispersion was then heated under stirring to dissolve the gelatin and hydrate the starch, until no more thickening occurred. Note than less starch was used in this case than in the cases of Examples 27 and 28 in order to produce yolks with lower viscosity.

| 29-A | |
|---|---|
| Natural Flavor compound | 0.4 grams |
| FREEZIST M Starch | 20 grams |
| Non fat milk powder | 20 grams |
| Gelatin 4ES | 14 grams |
| Water | 220 grams |
| McCormick yellow food color | 40 drops |

29-A was casted into a container approximately 15 cm × 15 cm, and put in the refrigerator. The sample was removed from the refrigerator in about 4 hours, and the strong gelled sheet, was cut into egg-yolk discs having a diameter of about 4 cm.

One of the egg-yolks made above was breaded with Locust Bean Gum FL 50-50 (Lot LE387), added to egg-white and fried. It had very good white skin, and it did not break during frying or during the transfer of the egg from the fry pan to a dish. The mouthfeel and taste were excellent. It was less viscous than the ones made in the cases of Examples 27 and 28, and thus more selective in determining the effectiveness of barrier layers in containing the egg-yolk.

Ten of the egg-yolks were breaded with the powders indicated below, added in egg-whites in small containers, and placed in the freezer.

| | |
|---|---|
| 29-1 | Locust Bean Gum. FL 50-50 |
| 29-4 | GENU PECTIN Type BB Rapid set. LOT # 923373 |
| 29-5 | FREEZIST M Starch |
| 29-7 | CMC Type 7LF. Lot # 62475 (01/90) |
| 29-9 | CMC Type 7H4F. Lot # 63360 (03/90) |
| 29-10 | Methocel A4M |
| 29-12 | Maxi-Gel 7724 starch |
| 29-15 | VARIGEL |
| 29-16 | CONTROL (no treatment) |
| 29-17 | KELGIN LV |

Four egg-yolks were treated as described below, added in egg-whites in small containers, and also placed in the freezer.

29-18

It was breaded with KELVIN LV, and then dipped in 1% CaCl$_2$ in water.

29-19

It was dipped in 1% KELGIN LV in water, and then in 1% CaCl$_2$ in water.

29-20

It was breaded in LOCUST BEAN GUM, dipped in 1% KELGIN LV in water, and then in 1% CaCl$_2$ in water.

29-21

It was breaded in GENU PECTIN Type BB Rapid set, dipped in 1% KELGIN LV in water, and then in 1% CaCl$_2$ in water.

The following was made by mixing well the powdered flavor with the starch, and then adding it to the water under vigorous stirring. Twenty drops of the Turmeric colorant were mixed with the dry milk and also added under vigorous stirring, followed by the addition of the gelatin under the same conditions. Finally, the color did not seem to be intense enough, and an additional 20 drops were added, which emulsified easily within the mixture. The dispersion was then heated under stirring to dissolve the gelatin and hydrate the starch, until no more thickening occurred. One could smell a resinous odor coming from the Turmeric. The taste was also bitter. This is in contrast to the 09744 Turmeric, which did not contribute any odor or taste whatsoever in a similar formulation (Experiment 24)

| 29-B | |
|---|---|
| Natural Flavor compound | 0.2 grams |
| FREEZIST M Starch | 10 grams |
| Turmeric Oleoresin 03210 | 20 drops |
| Non fat milk powder | 10 grams |
| Gelatin E4S | 7 grams |
| Water | 110 grams |
| Turmeric Oleoresin 03210 | 20 drops |

29-B was cast into a container approximately 6 cm × 10 cm, and put in the refrigerator. The sample was removed from the refrigerator in about 3 hours, and the strong gelled sheet, was cut into egg-yolk discs having a diameter of about 4 cm.

One egg-yolk of composition 29-B, placed in water overnight, did not show color leaching, while a similar egg-yolk corresponding to composition 29-A showed appreciable color leaching. Three of the egg-yolks having the composition 29-B were treated as described below, added in egg-whites in small containers, and then placed in the freezer.

29-19i

It was dipped in 1% KELGIN LV in water, and then in 1% CaCl$_2$ in water.

29-20i

It was breaded in LOCUST BEAN GUM, dipped in 1% KELGIN LV in water, and then in 1% CaCl$_2$ in water.

29-21i

It was breaded in_GENU PECTIN Type BB Rapid set, dipped in 1% KELGIN LV in water, and then in 1% CaCl$_2$ in water.

All frozen eggs were taken out of the freezer and allowed to thaw at room temperature for 5 hours. They were then tested by frying them. The results are as follows:

29-1—Excellent whitish skin in both uniformity and strength, judged by poking with a fork (best of all other ones in this experiment). The yolk was very well contained, and it did not break during cooking or transfer. It certainly looked like a real egg-yolk.

29-4—Similar to the above but the skin was weaker.

29-5—Very weak skin, which broke and the yolk was spread during cooking and ran during transfer. Some yellowish residue was left in the container.

29-7—Good whitish skin; no spreading of the yolk during cooking. The upper skin remained intact during transfer to a plate, but it broke at the underside, and some yolk ran.

29-9—Very white and very strong skin; no spreading or running.

29-10—Same as in case 29-9.

29-12—Same as in case 29-5.

29-15—Excellent looking whitish skin; no spreading or running.

29-16—Considerable spreading during cooking, and running during transfer.

29-17—Rather uneven skin, but strong. A large yellow halo had been formed around the yolk. No spreading or running occurred.

29-18—Large halo around the yolk with weak skin, which however did not break. No spreading or running occurred.

29-19—Thin skin which broke, causing some spreading of the yolk at one side during cooking, and running during transfer. The skin looks relatively strong, but easily rupturable, like a balloon full of liquid.

29-20—Strong white skin. No spreading or running occurred.

29-21—Same as in case 29-20.

29-19i, 29-20i, and 29-21i behaved in a similar manner as 29-19, 29-20, and 29-21, respectively.

This Example, among other teachings, demonstrates the better performance of hydrocolloids having self limiting dissolution at storing temperatures and film forming behavior at cooking temperatures, such as for example the locust bean gum, and the like, as compared to thin insoluble membranes, such as for example highly cross-linked alginates (Kelgin, and the like), which however, may also be utilized in less preferred embodiments of the instant invention. It also demonstrates once more the exudation resistance of the oil soluble colorants.

EXAMPLE 30

The following were made by mixing first all the dry ingredients except gelatin, adding the water in two equal portions, stirring vigorously, adding the color at once, stirring again until the colorant was dissolved, adding the gelatin under vigorous stirring, and heating to dissolve the gelatin and hydrate the starch, until no more thickening occurred.

| 30-1 | | |
|---|---|---|
| Natural Flavor compound* | 0.3 | grams |
| FREEZIST M Starch | 24 | grams |
| Non fat milk powder | 20 | grams |
| Water | 110 | grams |
| Water | 110 | grams |
| Turmeric #03285 | 10 | drops |
| KNOX gelatin | 14 | grams |

30-1 was cast into a container with dimensions $5\frac{3}{4}'' \times 5\frac{3}{4}''$, and put in the refrigerator. The sample was removed from the refrigerator in about 4 hours, and the gelled sheet was cut into egg-yolk discs having a diameter of $1\frac{1}{2}''$ and a thickness of about $5/16''-\frac{1}{2}''$ (weight about 8-12 grams per yolk), which in turn were breaded with Locust Bean Gum FL 50-50 (Lot LE387).

30-A1 to A4

Each egg yolk was put in a small container containing one egg-white, which had been previously acidified with 20 drops of "Pathmark" lemon Juice. It was then placed in the refrigerator.

30-A5

One egg yolk was put in a small container containing one egg-white, which had been previously acidified with 30 drops of "Pathmark" lemon Juice. It was then placed in the refrigerator.

30-B1 to -B4

Each egg yolk was put in a small container containing one egg-white, which had been previously acidified with 20 drops of "Pathmark" lemon Juice. It was then placed in the freezer.

30-B5

One egg yolk was put in a small container containing one egg-white, which had been previously acidified with 30 drops of "Pathmark" lemon Juice. It was then placed in the freezer.

30-C1 to -C2

Each egg yolk was initially placed under warm water until its edges were completely rounded and then it was put in a small container containing one egg-white, which had been previously acidified with 30 drops of "Pathmark" lemon Juice. It was then placed in the freezer.

30-D1 to -D2

Two pairs of egg yolks from a batch identical to 30-1, made three days earlier, were put in a two small containers, each containing two egg-whites, each of which had been previously acidified with 40 drops of "Pathmark" lemon Juice. The containers were then placed in the refrigerator.

One Day Later

30-C1 to -C2 and 30-D1 to -D2 were fried and consumed. They were excellent. No apparent color change had occurred. Yolks D1 separated from each other as the contents of the respective container were turned into the frypan. Yolks D2 were stuck on each other, and they were separated with some difficulty in the frypan. It seems that the loose barrier is disturbed to a certain degree by the separating operation, because light running occurred at a small portion of the periphery of one of the two yolks. In all cases, the rounding of the yolks was easier, and the fried yolks seemed to have lower viscosity than yolks which are placed in white and fried almost immediately. It seems that as the yolks stay in the white, they absorb liquid and their viscosity at serving temperatures is decreased. The viscosity of the above was excellent.

Two Days Later

30-A1 was fried; no apparent color change; excellent viscosity and other properties. When the color of -A1 was compared to the color of -A5, the color of the -A5 looked somewhat lighter.

Three Days Later

30-A2 was fried; no apparent color change of the yolk; no color bleaching to the white; excellent viscosity and other properties. 30-B1 to -B5 were transferred from the freezer to the refrigerator.

Four Days Later

30-A2, 30-B1, 30-A3, and 30-B2, were fried, two at a time. They all showed similar behavior. Both color and viscosity of the yolks were similar. The first couple were fried at higher temperature, and the yolks, mainly at the periphery showed bubbling during cooking, which disappeared upon transferring to a plate. It seems that lower temperatures are more desirable for frying. Also no bleaching seems to take place, and the lemon juice, which neutralizes the alkalinity of the white, prevents unacceptable color changes.

Five Days Later

30-B3 was fried; no apparent color change of the yolk; no color diffusion to the white; excellent viscosity and other properties.

Six Days Later

30-A4 and -B4 were fried; no apparent color change of the yolk; no color diffusion to the white; excellent viscosity and other properties.

Seven Days Later

30-A5 was fried; no apparent color change of the yolk; no color bleaching to the white; excellent viscosity. The restrictive barrier at the bottom of the yolk had been stuck to the bottom of the container, so that when the yolk along with the white were poured into the fry pan, the yolk fell in a way to have its bare side (no barrier) up. During frying, this was apparent as the yolk looked very shiny. Upon transferring to a plate, the yolk ran. It may be that the yolk settled too hard at the bottom of the container, since 30-A5 had 20 drops of lemon juice, and the viscosity of the white had dropped considerably. Also the yolk had stayed in the white for 7 days before frying. I think that some gum, such as for example xanthan gum (which also provides better freeze/thaw stability), added to the white for raising the viscosity will help considerably.

Eight Days Later

30-B5 was fried; same comments as in case of 30-A5, except that there was much less running because of the sticking of the yolk to the bottom of the container, and removal of part of the restrictive barrier.

EXAMPLE 31

The following were made by mixing first all the dry ingredients except gelatin, adding the water in two portions, stirring vigorously, adding the color at once, stirring again until the colorant was dissolved, adding the gelatin under vigorous stirring, and heating to dissolve the gelatin and hydrate the starch, until no more thickening occurred.

| 31-1 | |
|---|---|
| Natural Flavor compound | .05 grams |
| FREEZIST M Starch | 24 grams |
| Non fat milk powder | 20 grams |
| Water | 50 grams |
| Water | 170 grams |
| Turmeric #03285 | 10 drops |
| McCormick red food color | 2 drops |
| KNOX gelatin | 14 grams |

31-1 was cast into a container with dimensions $5\frac{3}{4}'' \times 5\frac{3}{4}''$, and put in the refrigerator. The sample was removed from the refrigerator in about 4 hours, and the gelled sheet was cut into egg-yolk discs having a diameter of $1\frac{1}{2}''$ and a thickness of about $5/16''-\frac{1}{2}''$ (weight about 8-12 grams per yolk), which in turn were breaded with Locust Bean Gum FL 50-50 (Lot LE387).

31-A1 to A5

Each egg yolk was put in a small container containing one egg-white, which had been previously acidified with 15 drops of "Pathmark" lemon Juice. It was then placed in the refrigerator. Actually, I meant to put 25 drops of lemon juice instead of 15, so one would expect to see some discoloration of the yolks with time.

Before putting the egg-white in the containers, I treated the inside of the containers with some oil, to see whether this will prevent sticking of the restrictive barrier. There was beading of the oil layer because of surface tension.

During the next few days I observed the eggs regarding their color. The color remained substantially the same. It seems that this calor combination is a very good imitation of a real yolk color.

After about one week in the refrigerator, the color was still acceptable, although not perfect, and the white had not attained any coloration.

The oil layer on the surface of the containers did not seem to help much.

EXAMPLE 32

The following were made by mixing first all the dry ingredients except gelatin, adding the water in two portions, stirring vigorously, adding the color at once, stirring again until the colorant was dissolved, adding the gelatin under vigorous stirring, and heating to dissolve the gelatin and hydrate the starch, until no more thickening occurred.

| 32-1 | |
|---|---|
| Natural Flavor compound* | .5 grams |
| FREEZIST M Starch | 24 grams |
| Non fat milk powder | 20 grams |
| Water | 50 grams |
| Water | 192 grams |
| Turmeric #03285 | 10 drops |
| McCormick red food color | 2 drops |
| KNOX gelatin | 14 grams |

32-1 was cast into a container with dimensions $5\frac{3}{4}'' \times 5\frac{3}{4}''$, and put in the refrigerator. The sample was removed from the refrigerator in about 4 hours, and the gelled sheet was cut into egg-yolk discs having a diameter of $1\frac{1}{2}''$ and a thickness of about $5/16''-\frac{1}{2}''$ (weight about 8-12 grams per yolk), which in turn were breaded with Locust Bean Gum FL 50-50 (Lot LE387).

Egg yolks from the above set were put in a small container containing one egg-white, and fried. The viscosity looked very good (like those of thin "sunny side up" egg).

The remainder from the gelled sheet were placed in the refrigerator.

EXAMPLE 33

The remainders from the two gelled sheets 32-1 were taken out of the refrigerator and were used in the following experiments.

| | 32-1 (grams) | Egg-white Powder* (grams) | % Powder |
|---|---|---|---|
| 33-1 | 50.0 | — | — |
| 33-2 | 47.5 | 2.5 | 5.0 |
| 33-3 | 46.25 | 3.75 | 7.5 |
| 33-4 | 45.0 | 5.0 | 10.0 |

32-1 was placed in a small pan and was heated to 60° C. in a water bath. The corresponding amount of Egg-white powder was then added to the molten 32-1 and mixed until dissolved. It was then casted to a mold corresponding to three yolks weighing about 13 grams each, and placed in the refrigerator. The gelled yolks were removed in about 4 hours from the refrigerator and the mold, breaded with Locust Bean Gum FL 50-50 (Lot LE387), each put in a container with egg-white, and fried. They were fried in three different ways; "up" without turning them over, "over" with turning them over, and "scrambled" in the fry pan.

In all cases corresponding to "up" frying, the yolks remained liquid, but their viscosity increased going from 1 to 4. From the ones containing egg-white (2-4) No 2 was by far the best, approaching the viscosity of No 1.

In the cases corresponding to "over" frying, the yolk No 1 ran without coagulating. The rest did not run. Again the best seemed to be No 2.

In the cases corresponding to "scrambled" frying, mixing seemed to be difficult in all cases. The best was No 1, with less and less mixing going to No 4. I think that when scrambled eggs are desired from one of these formulas, there should be instructions for the user to immerse the package to hot water in order to melt the yolk, and then mix the yolk and white before frying.

In all cases using yolks 33-2, -3, and -4, some discoloration of the yolk took place during frying. I think that this is due to the alkalinity of the egg-white powder, and neutralization may be necessary if this type of colorant is used. Also, neutralization or acidification may produce "crumbled" appearance, which is desirable for better imitating a yolk.

From the above, I come to the conclusion that white may be desirable in the yolk. Also, less than 5% may be better.

In order to run more experiments for this determination, the following were made by mixing first all the dry ingredients except gelatin, adding the water in two portions, stirring vigorously, adding the color at once, stirring again until the colorant was dissolved, adding the gelatin under vigorous stirring, and heating to dissolve the gelatin and hydrate the starch, until no more thickening occurred.

| 33-X | |
|---|---|
| Natural Flavor compound | .05 grams |
| FREEZIST M Starch | 24 grams |
| Non fat milk powder | 20 grams |
| Water | 50 grams |
| Water | 192 grams |
| Turmeric #03285 | 10 drops |
| McCormick red food color | 2 drops |
| KNOX gelatin | 14 grams |

33-X was cast into a container with dimensions 5¾"×5¾", and put in the refrigerator.

EXAMPLE 34

The gelled sheet 33-X was taken out of the refrigerator and was used in the following experiments.

| | 33-X (grams) | Egg-white Powder* (grams) | % Powder |
|---|---|---|---|
| 34-1 | 48.0 | 2.0 | 4.0 |
| 34-2 | 48.5 | 1.5 | 3.0 |
| 34-3 | 49.0 | 1.0 | 2.0 |
| 34-4 | 49.5 | 0.5 | 1.0 |

33-X was placed in a small pan and was heated to 60° C. in a water bath. The corresponding amount of Egg-white powder was then added to the molten 33-X and mixed until dissolved. It was then casted to a mold corresponding to three yolks weighing about 13 grams each, and placed in the refrigerator.

One Day Later

One egg from each series was breaded with Locust Bean Gum FL 50-50 (Lot LE387), each put in a container with egg-white, and fried. They were fried "up" until the white had almost completely been cooked, and then they were turned over.

In all cases the yolks remained liquid inside, but they coagulated on the surface, where they touched the pan. Only in case 34-4, the egg-yolk looked over-flattened, and it was ready to start running.

Since case 34-3 seemed to me to be borderline, I decided that the optimum content is about 2.5% of egg-white solids (by weight) in the egg-yolk composition that I am using. The color of yolks changed to redder upon cooking, which means that the white solids need neutralization.

EXAMPLE 35

The yolks of the previous experiments containing egg-white powder seemed to discolor during cooking. Thus, I decided to add some lemon juice to the formulation, in addition to the powdered egg-white. The following were made by mixing first all the dry ingredients except gelatin and egg-white, adding the water in two portions, stirring vigorously, adding the color at once, stirring again until the colorant was dissolved, adding the gelatin under vigorous stirring, heating to dissolve the gelatin and hydrate the starch, until no more thickening occurred, dropping the temperature to 50°-60° C., adding the egg-white powder, which was dissolved in water, under stirring, adding the lemon juice, continuing stirring for an additional 1-2 minutes and casting to a sheet form.

| 35-1 | |
|---|---|
| Natural Flavor compound | 0.5 grams |
| FREEZIST M Starch | 24 grams |
| Non fat milk powder | 20 grams |
| Water | 160 grams |
| Turmeric #03285 | 10 drops |
| McCormick red food color | 2 drops |
| KNOX gelatin | 14 grams |
| Egg-white powder | 7.5 grams |
| Water | 80 grams |
| Lemon Juice | 3 grams |

35-1 was cast into a container with dimensions 5¾"×5¾", and put in the refrigerator.

One Day Later

The gelled sample 35-1 was removed from the refrigerator and the gelled sheet was cut into egg-yolk discs having a diameter of 1½" and a thickness of about 5/16"-½" (weight about 10-12 grams per yolk), which in turn were breaded with Locust Bean Gum FL 50-50 (Lot LE387).

Ten egg yolks from the above set were each put in a small container containing one egg-white, which had previously been neutralized with 25 drops of lemon juice. Five of the containers (labelled "R") were put in the refrigerator and five (labelled "F") in the freezer.

Two Days Later

All five frozen eggs were transferred to the refrigerator. One container labelled "F" was put in lukewarm water to thaw (it took about ½ hour). Then this egg plus one labelled "R" were fried. Both exhibited excellent behavior. The former was cooked "over easy" while the latter was cooked "sunny side up". Some running occurred in the case of the "R" egg. The inside of the yolks remained liquid, and no discoloration was observed.

Three Days Later

One egg labelled "R" was fried "sunny side up". Everything was fine, except for the viscosity, which seemed to be reduced as compared to the viscosity of the eggs cooked yesterday, and the yolk was somewhat runny.

Four and Five Days Later

Same results as in the cases before.

Comments:

A. When I changed the order of addition in the case of making 35-1, in that I added all the water as in the previous cases before dissolving the gelatin and before hydrating starch, then lowered the temperature to 50°-60° C., added the lemon juice, and finally the powdered white, I was not able to dissolve all the white, a lot of which remained in blobs even after extended attempts to dissolve it.

B. It seems that the addition of some egg-white in the composition of the egg-yolk prolongs considerably the time that the yolk remains liquid at serving temperatures. I judged this by the time that the remainder of 35-1 in the pot, after the rest was casted into a sheet, stayed liquid around room temperature. Also the egg-yolk seems to absorb water faster than in the absence of egg-white in the yolk, producing some running in eggs having been stored.

EXAMPLE 36

The following were made by mixing first all the dry ingredients except gelatin, adding the water in two portions, stirring vigorously, adding the color at once, stirring again until the colorant was dissolved, adding the gelatin under vigorous stirring, and heating to dissolve the gelatin and hydrate the starch, until no more thickening occurred.

| 36- | 1 | |
|---|---|---|
| Natural Flavor compound | 0.5 | grams |
| FREEZIST M Starch | 24 | grams |
| Non fat milk powder | 20 | grams |
| Water | 115 | grams |
| Water | 115 | grams |
| Turmeric #03285 | 10 | drops |
| McCormick red food color | 2 | drops |
| KNOX gelatin | 14 | grams |

36-1 was cast into a container with dimensions 5¾"×5¾", and put in the refrigerator. The sample was removed from the refrigerator in about 7 hours, and the gelled sheet was cut into 12 egg-yolk discs having a diameter of 1½" and a thickness of about 5/16"-½" (weight about 8-12 grams per yolk).

One yolk labeled A was put in water, another yolk labeled B was put in egg-white, and the rest of the yolks, labeled C were breaded with Locust Bean Gum FL 50-50 (Lot LE387) and were also put in egg-white. The following measurements of weight gain of the yolk in each case were made. The same A and B yolks were used for all measurements, while a different yolk C was used in each measurement, since the breading was removed in order to determine the weight of the yolk.

| TIME (hours) | % weight change | | |
|---|---|---|---|
| | A | B | C |
| 0 | — | — | — |
| 24 | 28 | 16 | 9 |
| 47 | 37 | 22 | 12 |
| 72 | 46 | 25 | 16 |
| 96 | 51 | 28 | 19 |

EXAMPLE 37

The following were made by adding the water to the starch in two portions, stirring vigorously, adding the color at once, stirring again until the colorant was dissolved, adding the gelatin under vigorous stirring, and heating to dissolve the gelatin and hydrate the starch, until no more thickening occurred.

| 37- | 1 | |
|---|---|---|
| FREEZIST M Starch | 24 | grams |
| Water | 115 | grams |
| Water | 115 | grams |
| McCormick yellow food color | 20 | drops |
| KNOX gelatin | 14 | grams |

37-1 was cast into a container with dimensions 5¾"×5¾", and put in the refrigerator. The sample was removed from the refrigerator in about 5 hours, and the gelled sheet was cut into 12 egg-yolk discs having a diameter of 1½" and a thickness of about 5/16"-½" (weight about 8-12 grams per yolk).

One yolk labeled A was put in water, another yolk labeled B was put in egg-white, and the rest of the yolks, labeled C were breaded with Locust Bean Gum FL 50-50 (Lot LE387) and were also put in egg-white. The following measurements of weight gain of the yolk in each case were made. The same A and B yolks were used for all measurements, while a different yolk C was used in each measurement, since the breading was removed in order to determine the weight of the yolk.

| TIME (hours) | % weight change | | |
|---|---|---|---|
| | A | B | C |
| 0 | — | — | — |
| 24 | 32 | 18 | 10 |
| 48 | 44 | 23 | 18 |
| 72 | 51 | 32 | 20 |

EXAMPLE 38

The following was made by adding the color to water, stirring until the colorant was dissolved, adding the gelatin under vigorous stirring, and heating to dissolve the gelatin.

| 38- | 1 | |
|---|---|---|
| Water | 115 | grams |
| McCormick yellow food color | 10 | drops |
| KNOX gelatin | 14 | grams |

38-1 was cast into a container with dimensions 5¾"×5¾", and put in the refrigerator. The sample was removed from the refrigerator in about 4 hours, and the gelled sheet was cut into 12 egg-yolk discs having a diameter of 1½" and a thickness of about 5/16"-½" (weight about 8-12 grams per yolk).

One yolk labeled A was put in water, another yolk labeled B was put in egg-white, and the rest of the yolks, labeled C were breaded with Locust Bean Gum FL 50-50 (Lot LE387) and were also put in egg-white. The following measurements of weight gain of the yolk in each case were made. The same A and B yolks were used for all measurements, while a different yolk C was used in each measurement, since the breading was removed in order to determine the weight of the yolk.

| TIME | % weight change | | |
|---|---|---|---|
| (hours) | A | B | C |
| 0 | — | — | — |
| 24 | 25 | −5 | −7 |
| 48 | 32 | −8 | −9 |
| 72 | 38 | −8 | −9 |

EXAMPLE 39

The following were made by mixing first all the dry ingredients except gelatin and egg-white, adding the water in two portions, stirring vigorously, adding the color at once, stirring again until the colorant was dissolved, adding the gelatin under vigorous stirring, heating to dissolve the gelatin and hydrate the starch, until no more thickening occurred, dropping the temperature to 50°-60° C., adding the egg-white powder, which was dissolved in water, under stirring, adding the lemon juice, continuing stirring for an additional 1-2 minutes and casting to a sheet form.

| 39-1 | |
|---|---|
| Natural Flavor compound | 0.5 grams |
| FREEZIST M Starch | 24 grams |
| Non fat milk powder | 20 grams |
| Water | 160 grams |
| Turmeric #03285 | 10 drops |
| McCormick red food color | 2 drops |
| KNOX gelatin | 14 grams |
| Egg-white powder | 7.5 grams |
| Water | 70 grams |
| Lemon Juice | 3 grams |

39-1 was cast into a container with dimensions $5\frac{3}{4}''\times5\frac{3}{4}''$, and put in the refrigerator. The sample was removed from the refrigerator in about 5 hours, and the gelled sheet was cut into 12 egg-yolk discs having a diameter of $1\frac{1}{2}''$ and a thickness of about $5/16''-\frac{1}{2}''$ (weight about 8-12 grams per yolk).

One yolk labeled A was put in water, another yolk labeled B was put in egg-white and a yolk labeled D was put in water saturated with salt. The following measurements of weight gain of the yolk in each case were made. The same A, B, and D yolks were used for all measurements.

| TIME | % weight change | | |
|---|---|---|---|
| (hours) | A | B | D |
| 0 | — | — | — |
| 24 | 34 | 25 | 10 |
| 48 | 44 | 31 | 18 |
| 72 | 40 | 32 | 30 |
| 96 | 40 | 32 | — |

EXAMPLE 40

The following were made by mixing first all the dry ingredients except gelatin and egg-white, adding the water in two portions, stirring vigorously, adding the color at once, stirring again until the colorant was dissolved, adding the gelatin under vigorous stirring, heating to dissolve the gelatin and hydrate the starch, until no more thickening occurred, dropping the temperature to 50°-60° C., adding the egg-white powder, which was dissolved in water, under stirring, adding the lemon juice, continuing stirring for an additional 1-2 minutes and casting to a sheet form.

| 40-1 | |
|---|---|
| Natural Flavor compound | 0.5 grams |
| FREEZIST M Starch | 24 grams |
| Non fat milk powder | 20 grams |
| Water | 121 grams |
| Turmeric #03285 | 10 drops |
| McCormick red food color | 2 drops |
| KNOX gelatin | 14 grams |
| Egg-white powder | 7.5 grams |
| Water | 40 grams |
| Lemon Juice | 3 grams |

40-1 was cast into a container with dimensions $5\frac{3}{4}''\times5\frac{3}{4}''$, and put in the refrigerator. The sample was removed from the refrigerator in about 5 hours, and the gelled sheet was cut into 12 egg-yolk discs having a diameter of $1\frac{1}{2}''$ and a thickness of about $5/16''-\frac{1}{2}''$ (weight about 8-12 grams per yolk).

One yolk labeled A was put in water, another yolk labeled B was put in egg-white, and the rest of the yolks, labeled C were breaded with Locust Bean Gum FL 50-50 (Lot LE387) and were also put in egg-white. The following measurements of weight gain of the yolk in each case were made. The same A and B yolks were used for all measurements, while a different yolk C was used in each measurement, since the breading was removed in order to determine the weight of the yolk.

| TIME | % weight change | | |
|---|---|---|---|
| (hours) | A | B | C |
| 0 | — | — | — |
| 12 | 42 | 23 | 8 |
| 24 | 52 | 35 | 16 |
| 48 | 55 | 42 | 25 |
| 72 | 55 | 43 | 24 |
| 96 | 57 | 41 | 27 |

EXAMPLE 41

The following was made by adding the water to the starch and dry milk in two portions, stirring vigorously, adding the color at once, stirring again until the colorant was dissolved, adding the gelatin under vigorous stirring, and heating to dissolve the gelatin and hydrate the starch, until no more thickening occurred.

| 41-1 | |
|---|---|
| FREEZIST M Starch | 24 grams |
| Non-fat dry milk | 20 grams |
| Water | 115 grams |
| Water | 115 grams |
| McCormick yellow food color | 20 drops |
| KNOX gelatin | 6 grams |

41-1 was cast into a container with dimensions $5\frac{3}{4}''\times5\frac{3}{4}''$, and put in the refrigerator. The sample was removed from the refrigerator in about 5 hours, and the gelled sheet was cut into 12 egg-yolk discs having a diameter of $1\frac{1}{2}''$ grams per yolk). The small amount of gelatin used seemed to be just enough to form a handlable gel in the form of yolks, which were very delicate and fragile. The one which were breaded were considerably better in handling.

One yolk labeled A was put in water, another yolk labeled B was put in egg-white, and the rest of the yolks, labeled C were breaded with Locust Bean Gum FL 50-50 (Lot LE387) and were also put in egg-white. The following measurements of weight gain of the yolk in each case were made. The same A and B yolks were used for all measurements, while a different yolk C was used in each measurement, since the breading was removed in order to determine the weight of the yolk.

| TIME | % weight change | | |
|---|---|---|---|
| (hours) | A | B | C |
| 0 | — | — | — |
| 24 | 19 | 4 | 2 |
| 48 | 30 | 4 | 2 |
| 72 | 31 | 4 | 2 |

This experiment shows that by using the minimum amount of gel former needed to form a gel, which however is still handlable, overcomes the problem of excessive weight gain and water absorption by the yolk.

EXAMPLE 42

The following was made by adding the water to the starch and dry milk in two portions, stirring vigorously, adding the color at once, stirring again until the colorant was dissolved, adding the gelatin under vigorous stirring, and heating to dissolve the gelatin and hydrate the starch, until no more thickening occurred.

| 42-1 | |
|---|---|
| FREEZIST M Starch | 24 grams |
| Non-fat dry milk | 20 grams |
| Water | 110 grams |
| Water | 110 grams |
| McCormick yellow food color | 20 drops |
| KNOX gelatin | 14 grams |

42-1 was cast into a container with dimensions $5\frac{3}{4}'' \times 5\frac{3}{4}''$, and put in the refrigerator. The sample was removed from the refrigerator in about 5 hours, and the gelled sheet was cut into 12 egg-yolk discs having a diameter of $1\frac{1}{2}''$ and a thickness of about $5/16''-\frac{1}{2}''$ (weight about 8-12 grams per yolk).

Three days later, one yolk labeled B was put in egg-white, another yolk labeled E was put in egg-white containing 7%, and one yolk labeled F was put in egg-white containing 1.3% CMC 7H4F. The following measurements of weight gain of the yolk in each case were made. The same B, E, and F yolks were used for all measurements.

| TIME | % weight change | | |
|---|---|---|---|
| (hours) | B | E | F |
| 0 | — | — | — |
| 24 | 14 | 3 | 3 |
| 48 | 18 | 10 | 4 |
| 72 | 19 | 10 | 4 |

This experiment shows that solutes put in the egg-white help in preventing the yolk from absorbing excessive amount of water. Especially helpful was CMC, most probably because it raised the viscosity of the white to the consistency of a paste.

EXAMPLE 43

The following was made by adding the water to the starch and dry milk in one portion, stirring vigorously, adding the color at once, stirring again until the colorant was dissolved, adding the gelatin under vigorous stirring, and heating to dissolve the gelatin and hydrate the starch, until no more thickening occurred.

| 43-1 | |
|---|---|
| FREEZIST M Starch | 24 grams |
| Non-fat dry milk | 20 grams |
| Water | 144 grams |
| McCormick yellow food color | 20 drops |
| KNOX gelatin | 14 grams |

The above formula has less water so that the total weight is about 30% less than in most cases.

43-1 was cast into a container with dimensions $5\frac{3}{4}'' \times 5\frac{3}{4}''$, and put in the refrigerator. The sample was removed from the refrigerator in about 5 hours, and the gelled sheet was cut into 12 egg-yolk discs having a diameter of $1\frac{1}{2}''$ and a thickness of about $5/16''-\frac{1}{2}''$ (weight about 8-12 grams per yolk).

A yolk weighing 11.2 grams was put in water, and its weight was monitored until (18 hours) it gained about 30% weight (what was missing as indicated above). This yolk was then re-cut with the same device used above to assume again a diameter of $1\frac{1}{2}''$, it was breaded with Locust Bean Gum FL 50-50 (Lot LE387) and put in egg-white. It gained only 2% weight in 48 hours.

This experiment demonstrates an alternative technique of stabilizing the yolks of this invention with regard to weight gain and water absorption.

Examples demonstrating the operation of the instant invention have been given for illustration purposes only, and should not be construed as restricting the scope or limits of this invention in any way. In addition, it should be stressed that the preferred embodiments discussed in detail hereinabove, as well as any other embodiments encompassed within the limits of the instant invention, may be practiced individually or in any combination thereof, according to common sense and/or expert opinion. These combinations also lie within the realm of this invention. Furthermore, any attempted explanations in the discussion are only speculative and are not intended to limit the limits of this invention.

What is claimed is:

1. A simulated raw egg comprising:
   egg-white, the egg-white being liquid at room temperature and containing an additive solute; and
   a homogeneous shaped monolithic separate phase of a simulated non-flowable, egg-yolk disposed in the egg-white, said egg-yolk comprising an edible liquid, a colorant, and a positive thermoreversible gel former, the gel former being in an effective amount to render the egg-yolk
   non-flowable, as to substantially retain its monolithic status in, and be substantially immiscible with the liquid egg-white at room temperature after the egg-yolk has been chilled, and
   flowable at serving temperatures between cooking temperatures and room temperature for at least a finite period of time, after the egg-yolk has been brought to said serving temperatures from a higher temperature at which the egg-yolk becomes flowable;

the egg-yolk being characterized by an initial weight gain rate when it is in the egg-white in the absence of the additive solute; and the additive solute being in an effective amount to decrease the initial weight gain rate by at least 10%.

2. A simulated raw egg as defined in claim 1, further comprising a restrictive barrier surrounding the egg-yolk.

3. A simulated raw egg as defined in 2, wherein the restrictive barrier comprises a hydrocolloid having gel limiting dissolution in egg-white at storing temperatures, and film forming behavior at cooking temperatures.

4. A simulated raw egg as defined in claim 1, further comprising a viscosity builder.

5. A simulated raw egg as defined in claim 1, wherein the egg-yolk has a disk shape.

6. A simulated raw egg as defined in claim 1, packaged in a flexible pouch.

7. A method of making a simulated raw egg, comprising the steps of:

preparing a homogeneous simulated, non-flowable, egg-yolk by mixing an edible liquid, a colorant, and a viscosity modifier, the modifier being in an effective amount to render the egg-yolk non-flowable, as to substantially retain its monolithic status in, and be substantially immiscible with the liquid egg-white at room temperature after the egg-yolk has been chilled, and flowable at serving temperatures between cooking temperatures and room temperature for at least a finite period of time, after the egg-yolk has been brought to said serving temperatures from a higher temperature at which the egg-yolk becomes flowable;

shaping the mixture into monolithic egg-yolk portions;

lowering the temperature to a level adequate to render the egg-yolk portions non-flowable, as to substantially retain their monolithic status and be substantially immiscible in liquid egg-white at room temperature;

immersing the egg-yolk portions in an aqueous medium, the aqueous medium being adaptable to increase the weight of each egg-yolk portion to a predetermined degree;

removing the egg-yolk portions from the aqueous medium when the predetermined degree of weight increase has been achieved; and adding the monolithic egg-yolk portions to liquid egg-white.

8. A method as defined in claim 7, wherein the aqueous medium is water.

9. A method as defined in claim 7, further comprising a step of applying a restrictive barrier to the egg-yolk portions, before adding the egg-yolk portions to the liquid egg-white.

10. A method as defined in claim 9, wherein the restrictive barrier comprises a hydrocolloid having gel limiting dissolution in egg-white at storing temperatures, and film forming behavior at cooking temperatures.

11. A method as defined in claim 7, further comprising the step of adding the simulated raw egg in a flexible pouch.

* * * * *